US010959138B2

(12) United States Patent
Liu et al.

(10) Patent No.: US 10,959,138 B2
(45) Date of Patent: Mar. 23, 2021

(54) TERMINAL APPARATUS, BASE STATION APPARATUS, COMMUNICATION METHOD, AND CONTROL METHOD

(71) Applicant: SHARP KABUSHIKI KAISHA, Sakai (JP)

(72) Inventors: Liqing Liu, Sakai (JP); Takashi Hayashi, Sakai (JP); Shoichi Suzuki, Sakai (JP); Tomoki Yoshimura, Sakai (JP); Wataru Ouchi, Sakai (JP); Tatsushi Aiba, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 89 days.

(21) Appl. No.: 16/089,375

(22) PCT Filed: Feb. 15, 2017

(86) PCT No.: PCT/JP2017/005496
§ 371 (c)(1),
(2) Date: Sep. 28, 2018

(87) PCT Pub. No.: WO2017/169229
PCT Pub. Date: Oct. 5, 2017

(65) Prior Publication Data
US 2019/0124566 A1    Apr. 25, 2019

(30) Foreign Application Priority Data
Mar. 30, 2016  (JP) .............................. JP2016-069302

(51) Int. Cl.
*H04W 36/00* (2009.01)
*H04W 36/08* (2009.01)
*H04W 56/00* (2009.01)
*H04W 72/04* (2009.01)
*H04W 36/38* (2009.01)

(52) U.S. Cl.
CPC ... *H04W 36/0072* (2013.01); *H04W 36/0005* (2013.01); *H04W 36/08* (2013.01); (Continued)

(58) Field of Classification Search
CPC ......... H04W 36/0072; H04W 36/0005; H04W 72/04; H04W 56/00; H04W 36/38; H04W 36/08
See application file for complete search history.

(56) References Cited

U.S. PATENT DOCUMENTS

| 2014/0086213 A1* | 3/2014 | Kwon | ............... H04W 36/0055 370/331 |
| 2015/0173120 A1* | 6/2015 | Yamada | ............... H04W 76/27 370/331 |

(Continued)

OTHER PUBLICATIONS

"LTE; Evolved Universal Terrestrial Radio Access (E-UTRA); Physical channels and modulation", 3GPP TS 36.211 V13.0.0 Release 13 (Dec. 2015), Jan. 6, 2016.
(Continued)

*Primary Examiner* — Min Jung
(74) *Attorney, Agent, or Firm* — ScienBiziP, P.C.

(57) ABSTRACT

A terminal apparatus and a base station apparatus efficiently continue communication with each other. A terminal apparatus is configured to perform a handover from a source cell to a target primary cell, the terminal apparatus includes: a receiver configured to receive a handover command; and a transmitter configured to transmit an RRC complete message after starting synchronization with a downlink of the target primary cell, in which, in a case that a parameter MobilityControlInfo included in the handover command includes a parameter associated with a TA and in a case of detecting, in the target primary cell, a PDCCH to which a CRC parity bit scrambled by a C-RNTI is attached, a T304 timer is stopped.

18 Claims, 8 Drawing Sheets

(52) U.S. Cl.
CPC .......... *H04W 36/38* (2013.01); *H04W 56/00* (2013.01); *H04W 72/04* (2013.01)

(56) References Cited

U.S. PATENT DOCUMENTS

| | | | |
|---|---|---|---|
| 2016/0044639 A1* | 2/2016 | Yi | H04L 47/624 370/329 |
| 2016/0192261 A1* | 6/2016 | Wang | H04W 36/0055 370/331 |
| 2016/0219484 A1* | 7/2016 | Bontu | H04W 36/0072 |
| 2016/0381611 A1* | 12/2016 | Uchino | H04W 36/0061 370/331 |

OTHER PUBLICATIONS

"LTE; Evolved Universal Terrestrial Radio Access (E-UTRA); Multiplexing and channel coding", 3GPP TS 36.212 version 13.0.0 Release 13 (Dec. 2015), Jan. 6, 2016.

"LTE; Evolved Universal Terrestrial Radio Access (E-UTRA); Physical layer procedures", 3GPP TS 36.213 version 13.0.0 Release 13 (Dec. 2015), Jan. 6, 2016.

"LTE; Evolved Universal Terrestrial Radio Access (E-UTRA); Medium Access Control (MAC) protocol specification", 3GPP TS 36.321 V13.0.0 Release 13 (Dec. 2015), Jan. 14, 2016.

"LTE; Evolved Universal Terrestrial Radio Access (E-UTRA) and Evolved Universal Terrestrial Radio Access Network (E-UTRAN); Overall description; Stage 2", 3GPP TS 36.300 version 13.2.0 Release 13 (Dec. 2015), Jan. 13, 2016.

"LTE; Evolved Universal Terrestrial Radio Access (E-UTRA); Radio Resource Control (RRC); Protocol specification", 3GPP TS36.331 V13.0.0 Release 13 (Dec. 2015), Jan. 7, 2016.

"3rd Generation Partnership Project; Technical Specification Group Radio Access Network; Evolved Universal Terrestrial Radio Access (E-UTRA); Study on latency reduction techniques for LTE (Release 13)", 3GPP TR36.881 V0.5.0 (Nov. 2015), R2-157181, Dec. 4, 2015.

* cited by examiner

TERMINAL APPARATUS, BASE STATION APPARATUS, COMMUNICATION METHOD, AND CONTROL METHOD

TECHNICAL FIELD

The present invention relates to a terminal apparatus, a base station apparatus, a communication method, and a control method.

This application claims priority based on JP 2016-069302 filed on Mar. 30, 2016, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)" or "Evolved Universal Terrestrial Radio Access (EUTRA)"), and a radio access method and a radio network that achieve further high-speed data communication using wider-band frequency (hereinafter referred to as "Long Term Evolution-Advanced (LTE-A)" or "Advanced Evolved Universal Terrestrial Radio Access (A-EUTRA)")) have been studied (see NPLs 1, 2, 3, 4, 5, and 6). In LTE-A, a base station apparatus is also referred to as an evolved NodeB (eNodeB), and a terminal apparatus is also referred to as User Equipment (UE). LTE-A is a cellular communication system in which multiple areas each covered by the base station apparatus are deployed to form a cellular structure. A single base station apparatus may manage multiple cells.

In LTE-A, one downlink component carrier and one uplink component carrier are combined to constitute one cell. Note that, even only one downlink component carrier can constitute one cell. To a mobile station device, a cell is allocated by a signalling of an RRC layer from a base station apparatus (Configuration is performed). Additionally, the cell that is allocated to the mobile station device has two states of an inactive state in which radio transmission cannot be performed and an active state in which the radio transmission can be performed. Although the mobile station device communicates with the base station apparatus using one cell called a primary cell and zero or more cells called secondary cells, the primary cell is always in the active state. Additionally, all the secondary cells that are allocated to the mobile station device are made into the inactive state at a time of a handover, and are made into the active state by an explicit activation signalling (Activation command) from the base station apparatus after the handover.

At the time of the handover, a handover delay (Handover (HO) latency) may occur, and communication may temporarily be disconnected by the handover delay. In 3GPP, a study to reduce the handover delay has also been made (see NPL 7).

CITATION LIST

Non Patent Literature

NPL 1: 3GPP TS36.211 V13.0.0 (2015-12), 6 Jan. 2016
NPL 2: 3GPP TS36.212 V13.0.0 (2015-12), 6 Jan. 2016.
NPL 3: 3GPP TS36.213 V13.0.0 (2015-12), 6 Jan. 2016.
NPL 4: 3GPP TS36.321 V13.0.0 (2015-12), 14 Jan. 2016.
NPL 5: 3GPP TS36.300 V13.2.0 (2015-12), 13 Jan. 2016.
NPL 6: 3GPP TS36.331 V13.0.0 (2015-12), 7 Jan. 2016.
NPL 7: 3GPP TR36.881 v0.5.0 (2015-11), R2-157181, 4 Dec. 2015.

SUMMARY OF INVENTION

Technical Problem

However, as described above, in the existing LTE-A, there has been a problem that the communication between the base station apparatus and the terminal apparatus cannot be efficiently continued due to the handover delay.

An aspect of the present invention has been made in view of the above-described circumstances, and an object is to provide a terminal apparatus capable of efficiently continuing communication with a base station apparatus, a base station apparatus for communicating with the terminal apparatus, a communication method used in the terminal apparatus, a control method used in the base station apparatus, an integrated circuit mounted on the terminal apparatus, and an integrated circuit mounted on the base station apparatus.

Solution to Problem

A first aspect of the present invention has been made in order to solve the above-described problems, and is a terminal apparatus configured to perform a handover from a source cell to a target primary cell, the terminal apparatus includes: a receiver configured to receive a handover command via the source cell; and a transmitter configured to transmit an RRC complete message after starting synchronization with a downlink of the target primary cell, in which, in a case that a parameter MobilityControlInfo included in the handover command includes a parameter associated with a TA and in a case of detecting, in the target primary cell, a PDCCH to which a CRC parity bit scrambled by a C-RNTI is attached, a T304 timer is stopped.

A second aspect of the present invention has been made order to solve the above-described problems, and is a base station apparatus of a target primary cell, for communicating with a terminal apparatus configured to perform a handover from a source cell to the target primary cell, the base station apparatus includes: a transmitter configured to transmit a handover command to the terminal apparatus; and a receiver configured to receive an RRC complete message after synchronization with a downlink of the target primary cell being started, in which, in a case that a parameter MobilityControlInfo included in the handover command includes a parameter associated with a TA and in a case that, in the target primary cell, a PDCCH to which a CRC parity bit scrambled by a C-RNTI is attached is detected by the terminal apparatus, a T304 timer is stopped by the terminal apparatus.

A third aspect of the present invention has been made in order to solve the above-described problems, and is a communication method used in a terminal apparatus configured to perform a handover from a source cell to a target primary cell, the communication method includes the steps of: receiving a handover command via the source cell; transmitting an RRC complete message after starting synchronization with a downlink of the target primary cell; and stopping a T304 timer in a case that a parameter MobilityControlInfo included in the handover command includes a parameter associated with a TA and in a case of detecting, in the target primary cell, a PDCCH to which a CRC parity bit scrambled by a C-RNTI is attached.

A fourth aspect of the present invention has been made in order to solve the above-described problems, and is a communication method used in a base station apparatus of a target primary cell, for communicating with a terminal apparatus configured to perform a handover from a source cell to the target primary cell, the communication method includes the steps of: transmitting a handover command to the terminal apparatus; receiving an RRC complete message after synchronization with a downlink of the target primary cell being started; and stopping a T304 timer in a case that a parameter MobilityControlInfo included in the handover command includes a parameter associated with a TA and in a case that, in the target primary cell, a PDCCH to which a CRC parity bit scrambled by a C-RNTI is attached is detected by the terminal apparatus.

A fifth aspect of the present invention has been made in order to solve the above-described problems, and is an integrated circuit mounted on a terminal apparatus configured to perform a handover from a source cell to a target primary cell, the integrated circuit includes: a function to receive a handover command via the source cell; and a function to transmit an RRC complete message after starting synchronization with a downlink of the target primary cell, in which a function, in a case that a parameter MobilityControlInfo included in the handover command includes a parameter associated with a TA and in a case of detecting, in the target primary cell, a PDCCH to which a CRC parity bit scrambled by a C-RNTI is attached, to stop a T304 timer is caused to be exhibited.

A sixth aspect of the present invention has been made in order to solve the above-described problems, and is an integrated circuit mounted on a base station apparatus of a target primary cell, for communicating with a terminal apparatus configured to perform a handover from a source cell to the target primary cell, the integrated circuit includes: a function to transmit a handover command to the terminal apparatus; and a function to receive an RRC complete message after synchronization with a downlink of the target primary cell being started, in which a function, in a case that a parameter MobilityControlInfo included in the handover command includes a parameter associated with a TA and in a case that, in the target primary cell, a PDCCH to which a CRC parity hit scrambled by a C-RNTI is attached is detected by the terminal apparatus, to stop a T304 timer by the terminal apparatus is caused to be exhibited.

Advantageous Effects of Invention

According to an aspect of the present invention, a terminal apparatus and a base station apparatus can efficiently continue communication with each other.

DESCRIPTION OF EMBODIMENTS

Hereinafter, respective embodiments of the present invention will be described in detail with reference to the drawings.

First Embodiment

Figure 1:
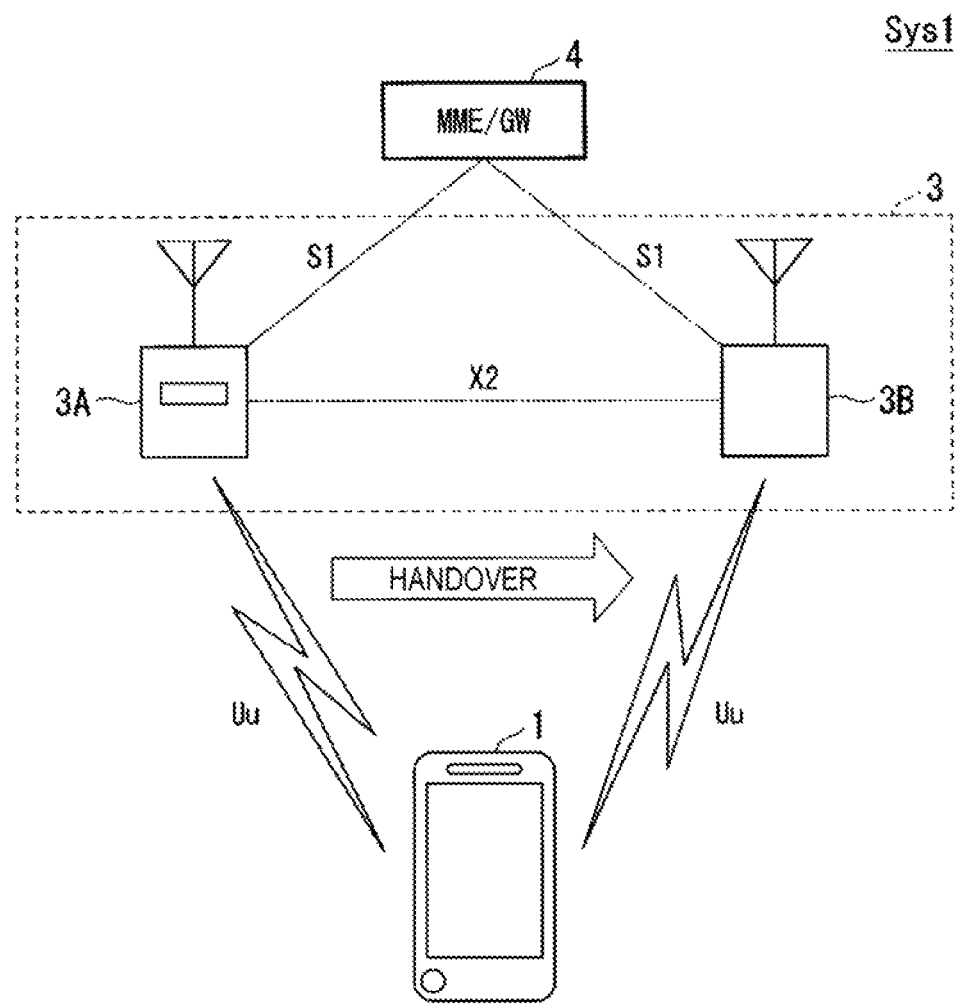
FIG. 1 is a schematic diagram illustrating an example of a configuration of a radio communication system according to a first embodiment of the present invention.

FIG. 1 is a schematic diagram illustrating an example of a configuration of a radio communication system according to a first embodiment of the present invention.

In FIG. 1, a radio communication system Sys1 is constituted by including a terminal apparatus 1, a base station apparatus 3, and a Mobility Management Entity (MME)/Gateway (GW) apparatus 4 in a core network. The base station apparatus 3 is constituted by including a base station apparatus 3A and a base station apparatus 3B. In a case that the name "base station apparatus 3" is used, it is assumed that both of the base station apparatus 3A and the base station apparatus 3B of the base station apparatus are indicated. Additionally, the base station apparatus 3 includes other multiple base station apparatuses (not illustrated) in addition to the base station apparatus 3A and the base station apparatus 3B. Note that, the base station apparatus 3 may include the MME/GW 4. The base station apparatus 3 is connected to the MME/GW 4 with a backhaul link S1 (also referred to as an S1 link). The base station apparatus 3A and the base station apparatus 3B are connected to each other with a backhaul link X2 (also referred to as an X2 link).

Here, in the present embodiment, the terminal apparatus 1 may perform a Handover (HO) from a source base station apparatus 3A that is in communication therewith to a target base station apparatus 3B. A case that the terminal apparatus 1 performs the handover from the source cell to the target cell will be described.

The base station apparatus 3A is a base station apparatus that is in communication with the terminal apparatus 1, The base station apparatus 3B is a base station apparatus that starts communication with the terminal apparatus 1. In the following descriptions, the base station apparatus 3A is referred to as the source base station apparatus 3A, the base station apparatus 3B is referred to as the target base station apparatus 3B.

The terminal apparatus 1 communicates with the base station apparatus 3 using an uplink to the base station apparatus 3 and a downlink from the base station apparatus 3 to the terminal apparatus 1.

The base station apparatus 3 communicates with the terminal apparatus 1 by forming (managing) multiple cells. The cell formed (managed) by the source base station apparatus 3A is referred to as a source cell. The source cell is also referred to as a source primary cell.

Additionally, the target base station apparatus 3B communicates with the terminal apparatus 1 by forming (managing) multiple cells that are different from those in the base station apparatus 3A. The cell formed (managed) by the target base station apparatus 3B is referred to as a target cell. The target cell is also referred to as a target primary cell.

Note that, the source base station apparatus 3A and the target base station apparatus 3B may be the same base station apparatus. In other words, the terminal apparatus 1 may perform the handover from the source cell managed by the source base station apparatus 3A to the target cell managed by the source base station apparatus 3A.

Here, physical channels and physical signals in the present embodiment will be described.

In uplink radio communication from the terminal apparatus 1 to the base station apparatus 3, the following uplink physical channels are used. The uplink physical channels are used by a physical layer for transmission of information output from a higher layer.

Physical Uplink control CHannel (PUCCH)
Physical Uplink Shared CHannel (PUSCH)
Physical Random Access CHannel (PRACH)

The PUCCH (physical uplink control channel) is a channel that is used to transmit Uplinkcontrol Information (UCI). The uplink control information includes: a Scheduling Request (SR) to be used to request a PUSCH (UpLink-Shared CHannel (UL-SCH)) resource for downlink Channel State Information (CSI) initial transmission; and HARQ control information (Hybrid Automatic Repeat request ACKnowledgement (HARQ-ACK)) for downlink data (a Transport block, a Medium Access control Protocol Data Unit (MAC PDU), a Downlink-Shared Channel (DL-SCH), or a Physical Downlink Shared CHannel (PDSCH)). The HARQ-ACK represents an acknowledgement (ACK) or a negative-acknowledgement (HACK). Here, the ACK indicates that reception on the DL-SCH/PDSCH has succeeded in the terminal apparatus 1, and the NACK indicates that the reception on the DL-SCH/PDSCH has failed in the terminal apparatus 1.

The CSI includes a Channel Quality Indicator (CQI), a Precoding Matrix Indicator (PMI), a Precoding Type Indicator (PTI), and a Rank Indicator (RI). Indication may be used as a notation for each indicator.

The PUSCH (physical uplink shared channel) is used for transmission of uplink data (UpLink-Shared CHannel (UL-SCH)). Additionally, the PUSCH is used, as a random access message 3, a layer-2 message, and a layer-3 message, for transmission (notification) of various higher layer parameters, various kinds of configuration information, and measurement information (measurement report, for example) relating the terminal apparatus 1. In addition, the PUSCH is also used for transmission (notification) of the Uplink Control Information. Furthermore, the PUSCH may be used to transmit the HARQ-ACK and/or the channel state information along with the uplink data not including the random access message 3. Furthermore, the PUSCH may be used to transmit only the channel state information or to transmit only the HARQ-ACK and the channel state information. Additionally, radio resource allocation information of the physical uplink shared channel is indicated by a physical downlink control channel.

The PRACH is used for transmission of a random access preamble (random access message 1). The PRACH is used for indicating an initial connection establishment procedure, a handover procedure, a connection re-establishment procedure, synchronization (timing adjustment) for uplink transmission, and a request for the PUSCH (UL-SCH) resource.

The following downlink physical channels are used for downlink radio communication from the base station apparatus 3 to the terminal apparatus 1. The downlink physical channels are used by the physical layer for transmission of information output from the higher layer.

Physical Broadcast CHannel (PBCH)
Physical Control Format indicator CHannel (PCFICH)
Physical Hybrid automatic repeat request Indicator CHannel (PHICH)
Physical Downlink control CHannel (PDCCH)
Enhanced Physical Downlink control CHannel (EPDCCH)
Physical Downlink Shared CHannel (PDSCH)
Physical Multicast CHannel (PMCH)

The PBCH (physical broadcast channel) is used for broadcasting a Master Information Block (MIB, Broadcast CHannel (BCH)), that is shared by the terminal apparatuses 1.

The PCFICH (physical control format indicator channel) is used for transmission of information indicating a region (OFDM symbols) to be used for transmission of the PDCCH.

The PHICH (Physical HARQ indicator channel) is used for transmission of an HARQ indicator (HARQ feedback, response information, and HARQ control information) indicating an ACKnowledgement (ACK) or a Negative ACKnowledgement (HACK) for the uplink data (UpLink Shared CHannel (UL-SCH)) received by the base station apparatus 3.

The PDCCH (physical downlink control channel) and the EPDCCH (enhanced physical downlink control channel) are used for transmission of Downlink control Information (DCI). The Downlink Control information is also referred to as a DCI format. The Downlink Control Information includes a downlink grant and an uplink grant. The downlink grant is also referred to as downlink assignment or downlink allocation.

One downlink grant is used for scheduling of one PDSCH within one serving cell. The downlink grant is used for scheduling of the PDSCH within a subframe same as the subframe in which the downlink grant is transmitted.

One uplink grant is used for scheduling of one PUSCH within one serving cell. The uplink grant is used for scheduling of the PUSCH within the fourth or later subframe from the subframe in which the uplink grant is transmitted.

The uplink grant transmitted on the PDCCH includes a DCI format 0. A PUSCH transmission scheme corresponding to the DCI format 0 is a single antenna port. The terminal apparatus 1 uses a single antenna port transmission scheme for the PUSCH transmission corresponding to the DCI format 0. The PUSCH to which the single antenna port transmission scheme is applied is used for transmission of one codeword (one transport block).

The uplink grant transmitted on the PDCCH includes a DCI format 4. A PUSCH transmission scheme corresponding to the DCI format 4 is closed-loop spatial multiplexing. The terminal apparatus 1 uses a closed-loop spatial multiplexing transmission scheme for the PUSCH transmission corresponding to the DCI format 4. The PUSCH to which the closed-loop spatial multiplexing transmission scheme is applied is used for transmission of up to two codewords (up to two transport blocks).

Cyclic Redundancy Check (CRC) parity bits attached to the downlink grant or the uplink grant are scrambled with a Cell-Radio Network Temporary Identifier (C-RNTI), Temporary C-RNTI, or a Semi Persistent Scheduling (SPS) C-RNTI. The C-RNTI and the SPS C-RNTI are identifiers for identifying a terminal apparatus within a cell. The Temporary C-RNTI is used in a contention based random access procedure.

The C-RNTI (an identifier (identification information) of the terminal apparatus) is used to control the PDSCH or the PUSCH in one subframe. The SPS C-RNTI is used to periodically allocate a resource for the PDSCH or the PUSCH. The Temporary C-RNTI is used for scheduling of retransmission of the random access message 3 and transmission of a random access message 4.

The PDSCH (physical downlink shared channel) is used for transmission of downlink data (Downlink Shared CHannel (DL-SCH)). The PDSCH is used for transmission of a random access message 2 (random access response). The PDSCH is used for transmission of a handover command.

The random access response includes a random access response grant. The random access response grant is an uplink grant that is transmitted on the PDSCH. The terminal apparatus 1 uses the single antenna port transmission scheme for the PUSCH transmission corresponding to the random access response grant and the PUSCH retransmission for the same transport block.

The PMCH is used for transmission of multicast data (Multicast CHannel (MCH)).

The following downlink physical signals are used in the downlink radio communication. The downlink physical signals are not used for transmission of information output from the higher layer, but are used by the physical layer.

Synchronization signal (SS)
Downlink Reference Signal (DL RS)

The Synchronization signal is used in order for the terminal apparatus 1 to be synchronized to frequency and time domains in the downlink.

The Downlink Reference Signal is used in order for the terminal apparatus 1 to perform channel compensation on the downlink physical channel. The Downlink Reference Signal is used in order for the terminal apparatus 1 to calculate downlink channel state information.

In the present embodiment, the following seven types of Downlink Reference Signals are used.

Cell-specific Reference Signal (CRS)
UE-specific Reference Signal (URS) associated with the PDS CH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference Signal (MBSFN RS)
Positioning Reference Signal (PRS)

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as a physical channel. The downlink physical signals and the uplink physical signals are collectively referred to as a physical signal.

The BCH, the MCH, the UL-SCH, and the DL-SCH are transport channels. A channel used in a Medium Access control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

Figure 2:
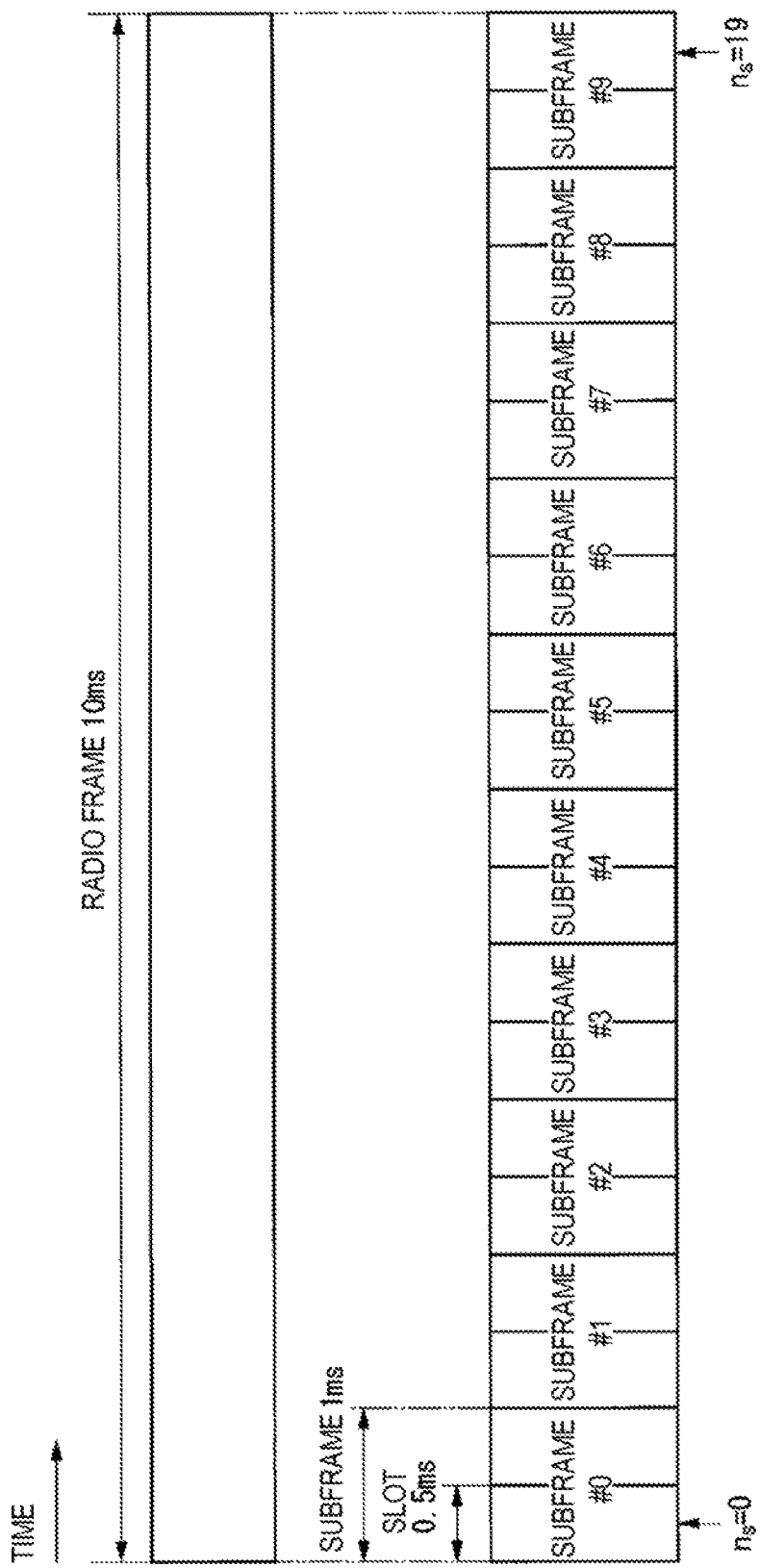
FIG. 2 is a diagram illustrating an example of a schematic configuration of a radio frame according to the first embodiment of the present invention.

FIG. 2 is a diagram illustrating an example of a schematic configuration of a radio frame according to the first embodiment of the present invention. In FIG. 2, a horizontal axis indicated by an arrow in the diagram expresses time.

Various field sizes in a time domain are expressed by the number of time units Ts=1/(15000×2048) seconds. The length of the radio frame is Tf=307200×Ts=10 ms. Each of the radio frames includes ten contiguous subframes in the time domain. The length of each subframe is Tsubframe=30720×Ts=1 ms. Each of the subframes i includes two contiguous slots in the time domain. The two contiguous slots in the time domain are a slot having a slot number ns of 2i in the radio frame and a slot having a slot number ns of 2i+1 in the radio frame. The length of each slot is Tslot=153600×ns=0.5 ms. Each of the radio frames includes ten contiguous subframes in the time domain. Each of the radio frames includes 20 contiguous slots (ns=0, 1, . . . , 19) in the time domain.

In the present embodiment, the following two types of uplink reference signals are also used for measurement (measuring, calculating) of a Timing Advance (TA, Time alignment). The TA is a transmission timing of the PUSCH transmission, PUCCH transmission, or the like.

Demodulation Reference Signal (DMS)
Sounding Reference Signal (SRS)

The DMRS (demodulation reference signal) is transmitted with the Physical Uplink control CHannel (PUCCH) or the Physical Uplink Shared CHannel (PUSCH). The DMRS is stored in a resource block of the PUCCH or the PUSCH, and time-multiplexed. The base station apparatus 3 uses the DMRS in order to perform channel compensation of the PUSCH or the PUCCH. Transmission of both of the PUSCH and the DMRS (while being multiplexed) is hereinafter referred to simply as transmission of the PUSCH. Transmission of both of the PUCCH and the DMRS (while being multiplexed) is hereinafter referred to simply as transmission of the PUCCH. In the present embodiment, it is assumed that the target base station apparatus 3B uses the DMRS, and, in order to demodulate an RRC complete message on the PUSCH, performs the channel compensation. Additionally, in the present embodiment, the DMRS is also used in the target base station apparatus 3B for the TA measurement.

The SRS (sounding reference signal) is used for a reception quality measurement or a timing adjustment for an application of a frequency scheduling. Additionally, the SRS is not associated with the transmission of the PUSCH or the transmission of the PUCCH. The base station apparatus 3 uses the SRS for a channel state measurement. The SRS is transmitted in a prescribed symbol in the uplink subframe. Specifically, the SRS is transmitted in a last SC-FDMA symbol, or an SC-FDMA symbol in an UpPTS. In the present embodiment, using the SRS, the base station apparatus 3A and the base station apparatus 3B may recognize the channel state or may measure the uplink timing. In the present embodiment, a case that the target base station apparatus 39 measures the TA from the terminal apparatus 1 to the target cell using the SRS will be described.

Next, a configuration of the radio frame according to the present embodiment will be described.

Figure 3:
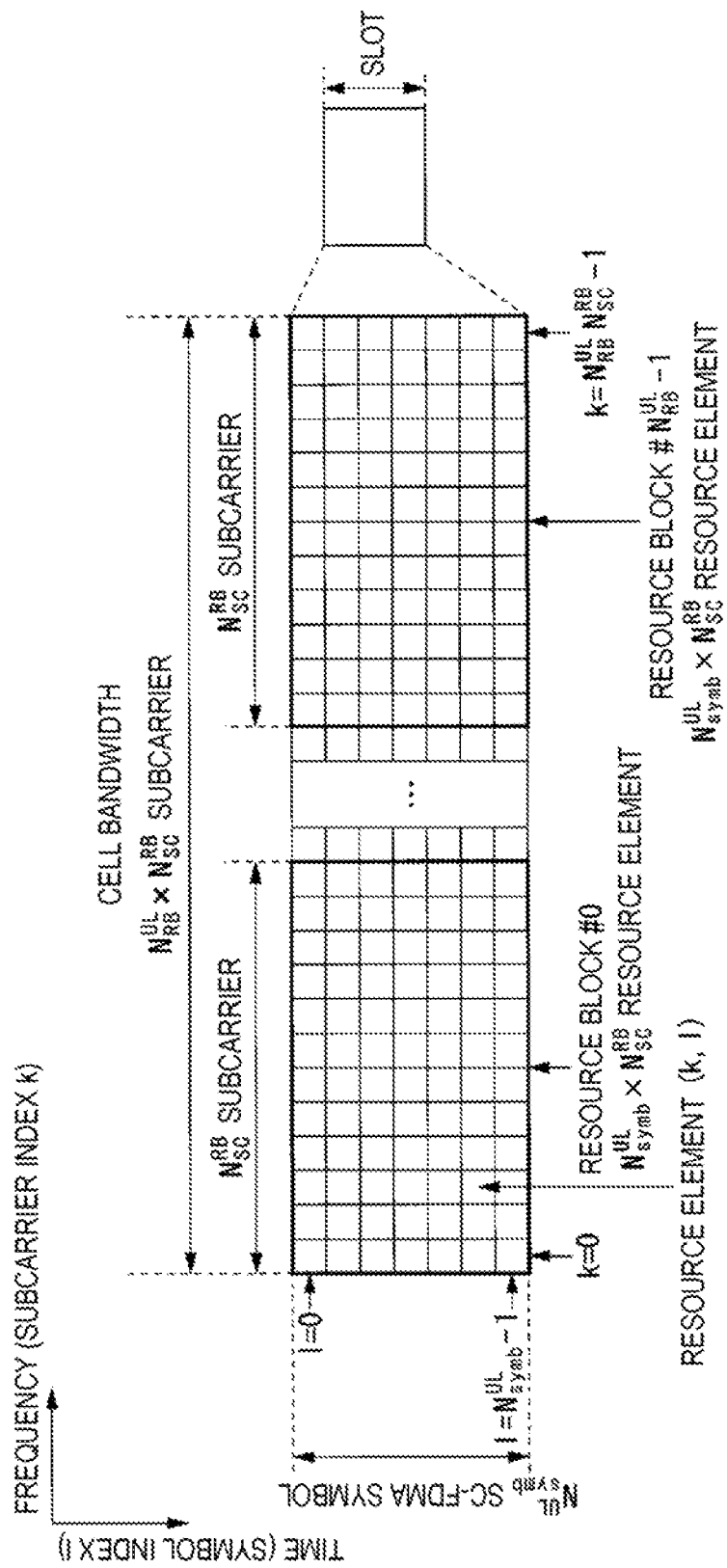
FIG. 3 is a diagram illustrating an example of a schematic configuration of an uplink slot according to the first embodiment of the present invention.

FIG. 3 is a diagram illustrating an example of a schematic configuration of an uplink slot according to the first embodiment of the present invention.

Each of the radio frames is 10 ms in length. Furthermore, each of the radio frames is constituted of 20 slots. Each of the slots is 0.5 ins in length, and the slots are numbered from 0 to 19, respectively. Each of the subframes is 1 ms in length and is defined by two consecutive slots. The i-th subframe within a radio frame is constituted of the (2×i)-th slot and the (2×i+1)-th slot. To be more precise, 10 subframes can be used at each interval of 10 ms.

The signal or the physical channel transmitted in each of the slots is expressed by a resource grid. The resource grid is defined by multiple subcarriers and multiple OFDM symbols. The number of subcarriers constituting one slot depends on a cell uplink bandwidth. Seven OFDM symbols constitute one slot in a case of a Normal Cyclic Prefix (NCP). Additionally, six OFDM symbols constitute one slot in a case of an Extended Cyclic Prefix (ECP) that is given a longer CP than that of the NCP. In other words, the number of the OFDM symbols constituting one slot may be based on the length of the given CP. Each element within the resource grid is referred to as a resource element. The resource element is identified by a subcarrier number and an OFDM symbol number.

The resource block is used to express allocation of a resource element of a certain physical uplink channel (the PUSCH or the like). For the resource block, a virtual resource block and a physical resource block are defined. The certain physical uplink channel is first mapped to the virtual resource block. Thereafter, the virtual resource block is mapped to the physical resource block. In a case of the NCP, one physical resource block is defined by seven consecutive OFDM symbols in a time domain and by 12 consecutive subcarriers in a frequency domain. In other words, one physical resource block includes (7×12) resource elements. In a case of the ECP, one physical resource block is defined by six consecutive OFDM symbols in a time domain and by 12 consecutive subcarriers in a frequency domain. In other words, one physical resource block includes (6×12) resource elements. Furthermore, one physical resource block corresponds to one slot in the time domain and corresponds to 180 kHz in the frequency domain. The physical resource blocks are numbered from 0 in the frequency domain.

Configurations of the terminal apparatus 1 and the base station apparatus 3 according to the present embodiment will be described below.

Figure 4:
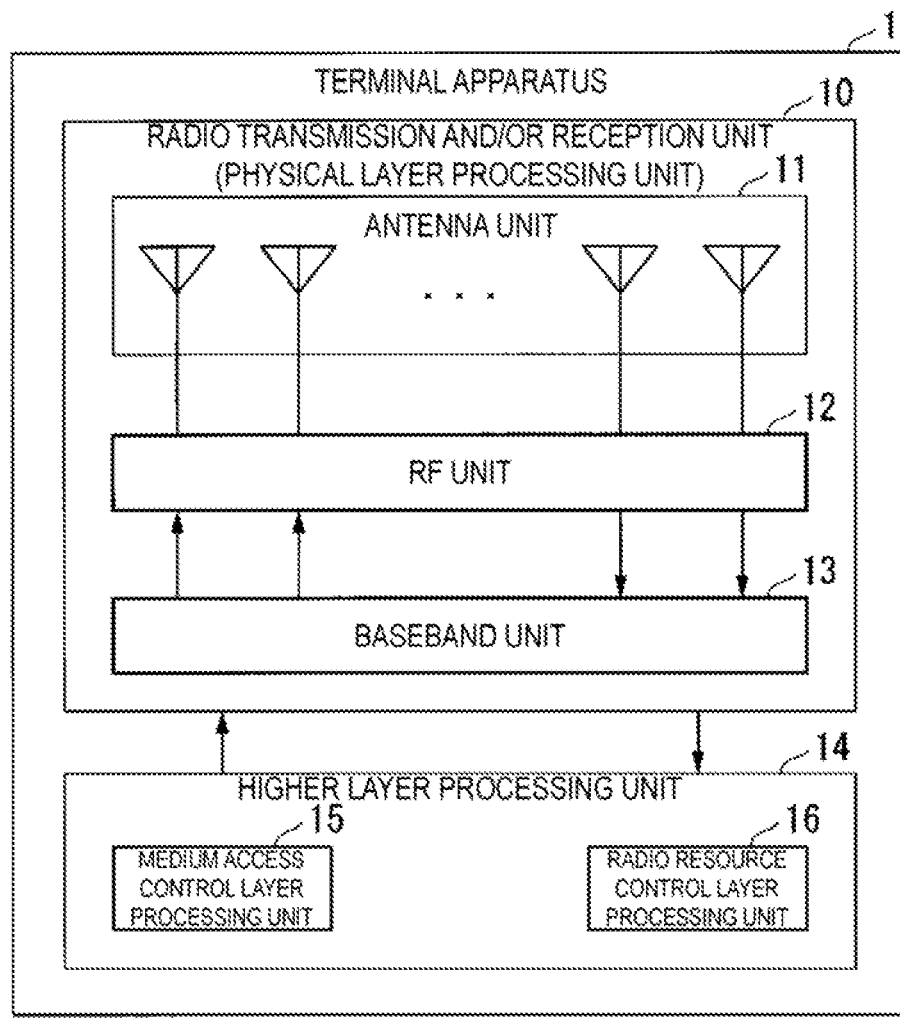
FIG. 4 is a schematic block diagram illustrating an example of a configuration of a terminal apparatus according to the first embodiment of the present invention.

FIG. 4 is a schematic block diagram illustrating an example of the configuration of the terminal apparatus 1 according to the first embodiment of the present invention.

The terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16, Note that, although the radio transmission and/or reception unit 10 is described as a unit in which respective functions of a transmitter and a receiver are integrated, the transmitter and the receiver may be separately provided. Additionally, in the following descriptions, the radio transmission and/or reception unit 10 may be referred to as the transmitter, receiver, a physical layer processing unit, or the like in some cases.

Note that, each function portion of the terminal apparatus 1 may be constituted so as to be capable of being achieved using one or multiple integrated circuits, or may be achieved using software.

The higher layrer processing unit 14 outputs uplink data (transport block) generated by a user operation or the like, to the radio transmission and/or reception unit 10. The higher layer processing unit 14 performs processing of the Medium Access Control (MAC), a Packet Data Convergence Protocol (PDCP) layer, a Radio Link Control (RLC) layer, and a Radio Resource control (RRC) layer.

Each processing performed by the higher layer processing 4 will be described in more detail.

The medium access control layer processing unit 15 performs processing of the Medium Access Control layer. The medium access control layer processing unit 15 controls transmission of a scheduling request, based on various types of configuration information, various types of parameters, and the like managed by the radio resource control layer processing unit 16.

The radio resource controllayer processing unit 16 performs processing of the radio resource control layer. The radio resource control layer processing unit 16 manages the various types of configuration information, the various types of parameters, and the like of the terminal apparatus 1. The radio resource control layer processing unit 16 sets the various types of configuration information, the various types of parameters, and the like based on higher layer signaling received from the base station apparatus 3. That is, the radio resource control layer processing unit 16 sets, based on information indicating the various types of configuration information, the various types of parameters, and the like received from the base station apparatus 3, the various types of configuration information, the parameters, and the like corresponding to the received information.

The radio transmission and/or reception unit 10 performs processing of the physical layer relating to the radio communication, such as modulation and demodulation, coding and decoding. The radio transmission and/or reception unit 10 (receiver) demultiplexes, demodulates, and decodes a signal received from the base station apparatus 3, and outputs the information resulting from the decoding to the higher layer processing unit 14. The radio transmission and/or reception unit 10 (transmitter) modulates and codes data to generate a transmit signal, and transmits the transmit signal to the base station apparatus 3.

The RF unit 12 converts (down-converts) a signal received via the antenna unit 11 into a baseband signal by orthogonal demodulation and removes unnecessary frequency components. The RF unit 12 outputs the analog signal that is subjected to processing to remove the unnecessary frequency components to the baseband unit 13.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

Additionally, the baseband unit 13 performs Inverse Fast Fourier Transform (IFFT) on data, generates an SC-FDMA symbol, attaches the CP to the generated SC-FDMA symbol, generates a baseband digital signal, and converts the generated baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the final result via the antenna unit 11. Furthermore, the RF unit 12 amplifies power of the transmit signal. Furthermore, the RF unit 12 may have a function of controlling transmit power. The RF unit 12 is also referred to as a transmit power control unit.

Figure 5:
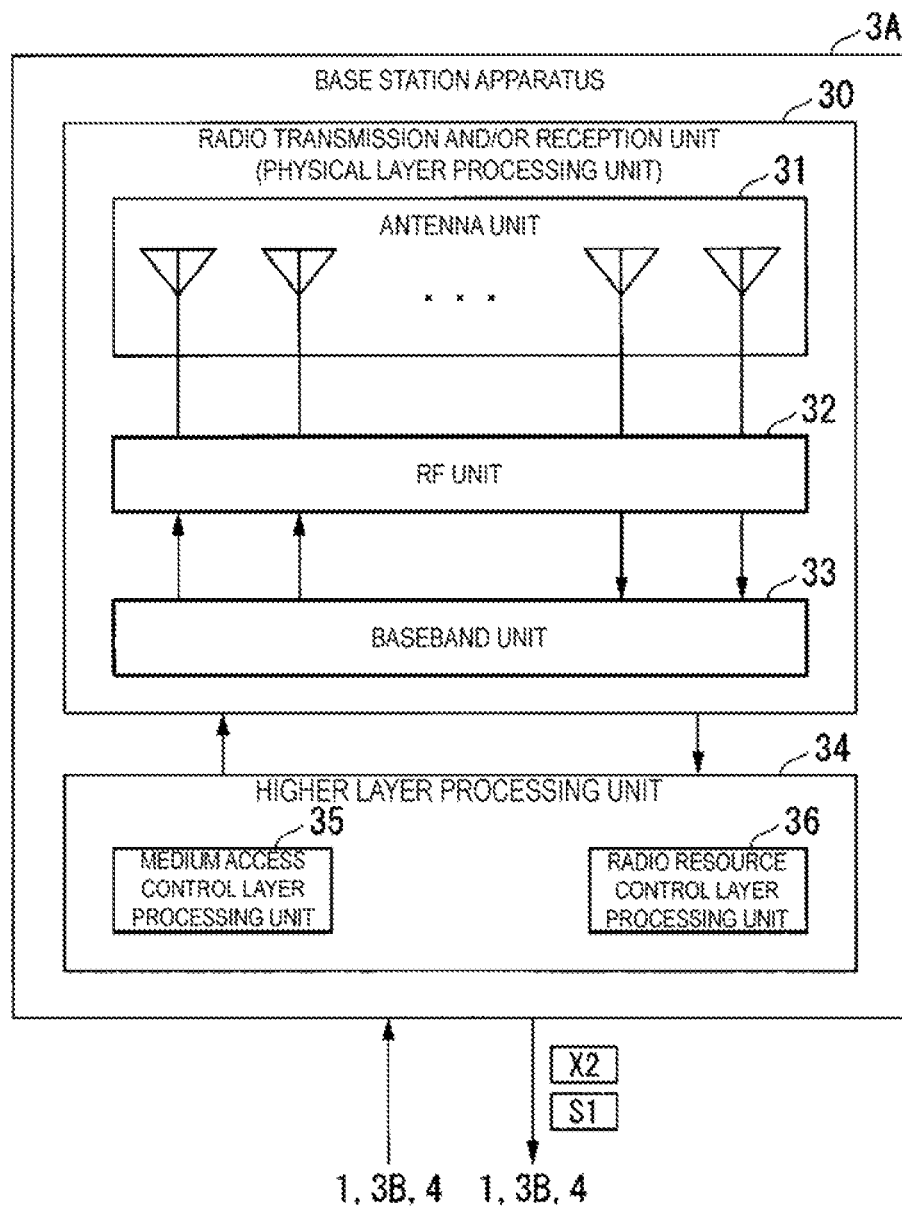
FIG. 5 is a schematic block diagram illustrating an example of a configuration of a base station apparatus according to the first embodiment of the present invention.

FIG. 5 is a schematic block diagram illustrating an example of the configuration of the base station apparatus 3A according to the first embodiment of the present invention.

The base station apparatus 3A is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. Note that, although the radio transmission and/or reception unit 30 is described as a unit in which respective functions of a transmitter and a receiver are integrated, the transmitter and the receiver may be separately provided. Additionally, in the following descriptions, the radio transmission and/or reception unit 30 may be referred to as the transmitter, the receiver, a physical layer processing unit, or the like in some cases.

In addition, although the configuration of the base station apparatus 3A is described, the base station apparatus 3B also has the same configuration as that of the base station apparatus 3A and description and illustration thereof will therefore be omitted.

The higher layer processing unit 34 performs processing of the Medium Access Control (MAC) layer, a Packet Data Convergence Protocol (PDCP) layer, a Radio Link Control (RLC) layer, and the Radio Resource Control (RRC) layer.

Processing of the higher layer processing unit 34 will be described in more detail.

The medium access control layer processing unit 35 performs processing of the Medium Access Control layer. The medium access control layer processing unit 35 performs processing associated with a scheduling request, based on various types of configuration information, various types of parameters, and the like managed by the radio resource control layer processing unit 36.

The radio resource control layer processing unit 36 performs processing of the Radio Resource Control layer. The radio resource control layer processing unit 36 generates, or acquires from a higher node (higher layer), downlink data (transport block) arranged on a physical downlink shared channel, system information, an RRC message (RRC signalling), a MAC control Element (CE), and the like, and outputs the generated or acquired data to the radio transmission and/or reception unit 30. Furthermore, the radio resource control layer processing unit 36 manages the various types of configuration information, the various types of parameters, and the like for each of the terminal apparatuses 1. The radio resource control layer processing unit 36 may set the various types of configuration information, the various types of parameters, and the like for each of the terminal apparatuses 1 via the higher layer signaling. In other words, the radio resource control layer processing unit 36 may transmits (broadcasts, notifies, indicates) information indicating the various types of configuration information, the various types of parameters, and the like to each of the terminal apparatuses 1, another base station apparatus, a higher node (the MME/GW 4, or the like, for example), or the like.

The radio transmission and/or reception unit 30 is similar to the radio transmission and/or reception unit 10, and hence description thereof is omitted.

Note that, each function portion of the base station apparatus 3A (base station apparatus 3) may be constituted so as to be capable of being achieved using one or multiple integrated circuits, or may be achieved using software.

Next, a handover procedure according to the first embodiment will be described.

Figure 6:
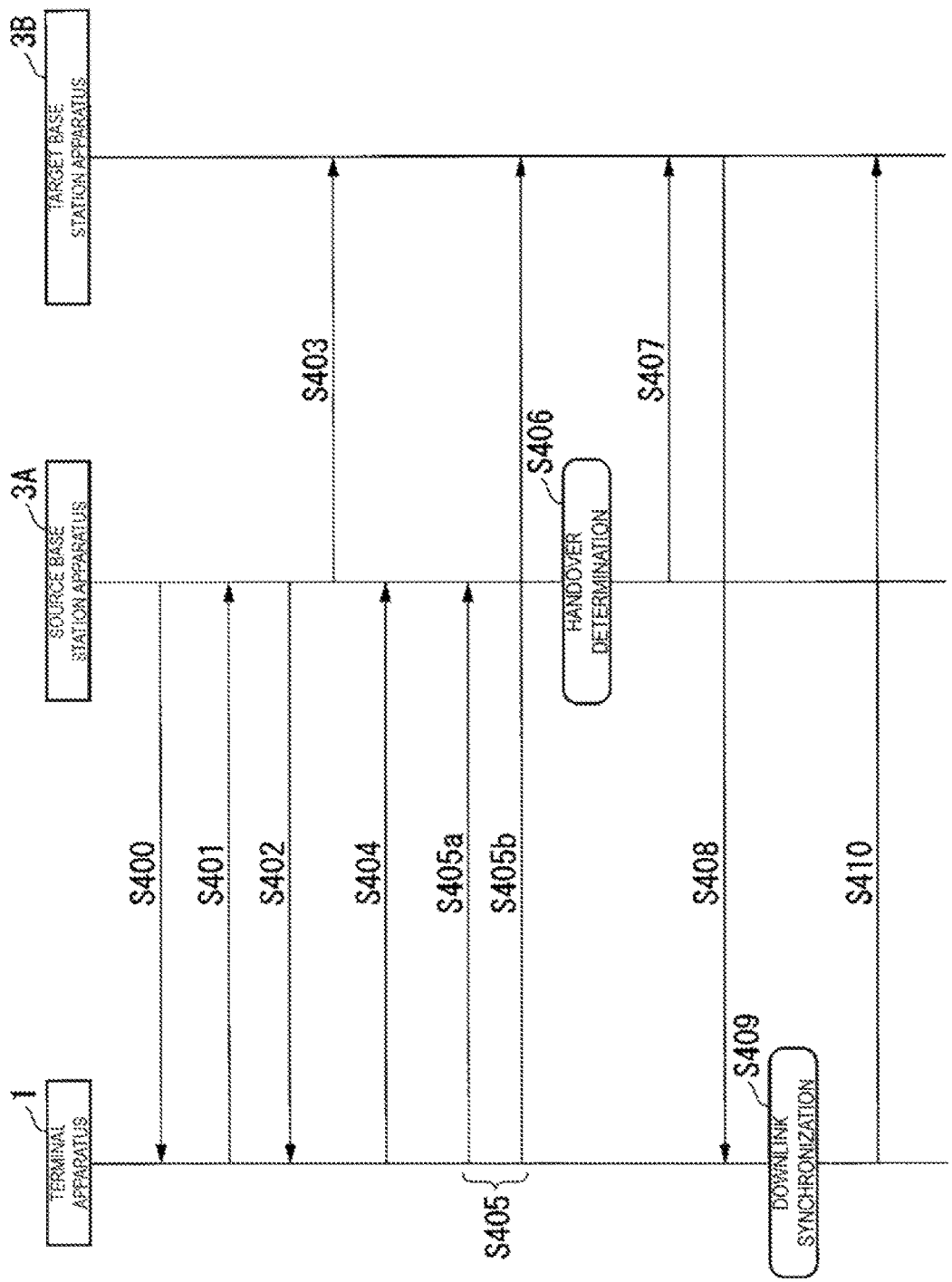
FIG. 6 is a diagram illustrating an example of a handover procedure according to the first embodiment of the present invention.

FIG. 6 is a diagram illustrating an example of the handover procedure according to the first embodiment of the present invention.

In step S400, the source base station apparatus 3A transmits, to the terminal apparatus 1, a measurement control message (for example, an RRC ConnectionReconfiguration message including a parameter measConfig). This measurement control message may include a list of measurement object cells. Additionally, the source base station apparatus 3A may provide a list (information) indicating one or multiple measurement object cells using the list of the measurement object cells. Here, in the measurement object cells, in addition to cells managed by the source base station apparatus 3A, cells managed by the target base station apparatus 3B may be included. Note that, in a case that the terminal apparatus 1 measures cells in different frequency bands, the source base station apparatus 3A may notify the terminal apparatus 1 of measurement gap information. In this case, the measurement gap information may be individually notified, or may be included in the measurement control message and transmitted.

In step S401, the terminal apparatus 1 measures a channel state of the measurement object cell based on the measurement control message, and transmits (reports, notifies) a measurement report indicating a measurement result to the source base station apparatus 3A. The terminal apparatus 1 may measure a channel state of a cell other than the cells in the list of the measurement object cells provided from the source base station apparatus 3A, and may transmit a measurement result thereof as a measurement report to the source base station apparatus 3A. In this case, in the cells other than the cells in the list of the measurement object cells, the cells managed by the target base station apparatus 3B may be included.

In step S402, the source base station apparatus 3A transmits, to the terminal apparatus 1, RRC signalling (RRC ConnectionReconfiguration message) including configuration information relating to SRS transmission (SRS configuration information, SRS Information (SRS transmission information)). Note that, the RRC signalling including the SRS configuration information in step S402 may be included in the RRC ConnectionReconfiguration message in the transmission of the measurement control message in step S400. In other words, in step S400, the SRS configuration information and the measurement control message may be transmitted together. Additionally, in the SRS configuration information, SRS configuration information configured in the cell in a common (shared) manner (for example, sounding RS-UL-ConfigCommon) and/or SRS configuration information dedicatedly (individually) configured with respect to the terminal apparatus 1 (for example, sounding RS-UL-ConfigDedicated) may be included.

In step S403, the source base station apparatus 3A transmits, to the target base station apparatuses 3B (multiple target base station apparatuses included in the list of the measurement object cells), via a backhaul link X2, the SRS configuration information with respect to the terminal apparatus 1, and shares the SRS configuration information with the target base station apparatuses 3B (the multiple target base station apparatuses included in the list of the measurement object cells). With this, the target base station apparatus 3B can detect, based on the shared SRS configuration information, the SRS transmitted from the terminal apparatus 1.

In step S404, the terminal apparatus 1 transmits an RRC signalling complete message, as a response to the KRC signalling in which the SRS configuration information in step S402 is included, to the source base station apparatus 3A. Here, the RRC signalling complete message may be a message indicating that the terminal apparatus 1 establishes a connection with the source base station apparatus 3A.

In step S405, the terminal apparatus 1 transmits the SRS in a prescribed cell. To be more specific, the terminal apparatus 1 transmits the SRS, in step S405a, to the source base station apparatus 3A in the prescribed cell, and the terminal apparatus 1 transmits the SRS, in step S405b, to the target base station apparatuses 3B (the multiple target base station apparatuses included in the list of the measurement object cells) in the prescribed cell.

Each of the source base station apparatus 3A and the target base station apparatuses 3B (the multiple target base station apparatuses included in the list of the measurement object cells) receives the SRS from the terminal apparatus 1 and then measures the TA using the SRS. Note that, in a case that the source base station apparatus 3A and the target base station apparatus 3B are present at the same geographical place (location), the target base station apparatus 3B may measure the TA using the SRS or may not measure the TA. In other words, the target base station apparatus 3B may share the TA of the source base station apparatus 3A.

Note that, in a case that the multiple cells aggregated to the terminal apparatus 1 have an intra-band, at least one prescribed cell may transmit the SRS with respect to the intra-band. In a case that the TA is required to be measured using the SRS in a cell not aggregated to the terminal apparatus 1, the source base station apparatus 3A and/or the target base station apparatus 3B may transmit the SRS while adding the cell. Additionally, information on the cell being added may be included in the RRC signalling in step S402.

In step S406, the source base station apparatus 3A selects (determines), based on the measurement report in step S401 and Radio Resource Manegement (RRM) information, whether to perform the handover, and, in a case of performing the handover, selects (determines) a target base station apparatus to be a handover destination among the multiple target base station apparatuses. Here, the RRM information is information relating to the measurement (for example, a parameter measConfig or a parameter associated with the measurement object cell) included in the measurement control message of which the source base station apparatus 3A notifies the terminal apparatus 1.

In step S407, the source base station apparatus 3A transmits a handover request message to the target base station apparatus 3B that is selected (determined) as the handover destination in step S406.

In step S408, the target base station apparatus 3B selects a target cell with respect to the terminal apparatus 1. The target base station apparatus 3B transmits a handover command to the terminal apparatus 1 via the source base station apparatus 3A. The handover command is the RRCConnectionReconfiguration message including a parameter mobilityControlInfo. The parameter MobilityControlInfo may include information (parameter) TA Command indicating the TA that is measured using the SRS, and information (parameter) UL grant indicating the uplink resource.

Note that, the parameter MobilityControlInfo may include a T304 timer that is a handover timer, a new C-RNTI (terminal apparatus identifier) of the terminal apparatus 1 in the target cell, and various types of configuration information relating to the target cell. Additionally, the various types of configuration information relating to the target cell may include information to indicate a Physical layer Cell Identity (PCI) of the target cell, and information to indicate a frequency of the target cell.

In the present embodiment, as described above, the target base station apparatus 3B notifies the terminal apparatus 1 of the parameter TA Command indicating the TA measured in the target base station apparatus 3B while including it in the parameter mobilityControlInfo. The target base station apparatus 3B may notify the terminal apparatus 1 of an adjustment value of a transmission timing of the PUSCH in the source cell (an adjustment value of a PUSCH transmission timing based on the measured TA), or an absolute TA value of the PUSCH transmission in the target cell (an absolute value of the TA indicating the transmission timing of the PUSCH), as the parameter TA Command, while including the value in the parameter mobilityControlInfo, in accordance with a capability of the terminal apparatus 1.

Note that, the parameter mobilityControlInfo may include information associated with a radio frame number of the target cell. The radio frame number information is one-bit information indicating whether synchronization is established between the source cell and the target cell. In a case that the synchronization is not established between the source cell and the target cell, as the radio frame number information, an offset value of the radio frame number of the target base station apparatus 3B with respect to the source base station apparatus 3A may be indicated, or the radio frame number of the target base station apparatus 3B may be indicated. Note that, the handover command transmitted to the terminal apparatus 1 in step S408 may include information indicating a subframe in which the terminal apparatus 1 can transmit the RRC complete message (for example, information indicating a number of a subframe in which the RRC complete message transmission can be transmitted) in step S410, which will be described later. The information indicating the subframe in which the RRC complete message is transmitted (for example, information indicating the number of the subframe in which the RRC complete message is transmitted) may be configured beforehand in the target cell. Note that, the number of the subframe may be an index number that is given to the subframe.

With this, the terminal apparatus 1 can perform the RRC complete message transmission in the uplink subframe based on at least the PBCH (MIB) before acquiring the radio frame number. In other words, the terminal apparatus 1 can reduce a handover delay.

In step S409, the terminal apparatus 1 perform downlink synchronization of the target cell based on various types of configuration information, which is included in the parameter mobilityControlInfo, relating to the target cell. The terminal apparatus 1 uses, in the downlink synchronization, as downlink synchronization information and/or the physical channel, any one or all of the synchronization signal of the target cell, the CRS of the target cell, and the PBCH of the target cell.

Note that, in a case that the parameter TA Command is not included in the handover command received in step S408, or in a case that the TA Command cannot be detected by the capability of the terminal apparatus 1 even in a case that the TA Command is included, in order to perform uplink synchronization in addition to the downlink synchronization, a random access procedure, which will be described later, may be performed, and in a case that information indicating a preamble used for the random access procedure is included in the parameter mobilityControlInfo instead of the parameter TA Command, the random access procedure, which will be described later, may be performed.

Additionally, even in a case that the parameter TA Command is included in the parameter mobilityControlInfo, the information indicating the preamble used for the random access procedure may be included in the parameter mobilityControlInfo. Note that, in a case that both the parameter TA Command and the information indicating the preamble used for the random access procedure are included in the parameter mobilityControlInfo, whether to perform the handover procedure based on the TA command or to perform the handover procedure based on random access may be determined based on a prescribed parameter included in the handover command. Additionally, in a case that both the parameter TA Command and the information indicating the preamble used for the random access procedure are included in the parameter mobilityControlInfo, it is defined beforehand in the parameter mobilityControlInfo that which one of the parameter TA Command and the information indicating the preamble used for the random access procedure is used to perform the handover procedure. Note that, being defined beforehand may be such that an operation is defined in a specification or the like.

In step S410, the terminal apparatus 1 adjusts, in the target cell, based on the TA Command and the uplink grant (UL grant) included in the notified (received) handover command, the transmission timing using the TA included in the TA Command, and transmits, using the uplink resource (PUSCH) based on the UL grant, the RRC complete message (RRCConnectionReconfigurationComplete message) including the C-RNTI. Here, the RRC complete message may be a message indicating that a connection with the target cell is established.

Note that, the terminal apparatus 1 may include capability to calculate (measure) the TA with respect to the target cell. In this case, the terminal apparatus 1 may transmit the RRC complete message in step S410 using the calculated TA. The terminal apparatus 1 may attempt to receive/decode a response from the target base station apparatus 3B to the PUSCH on which the RRC complete message is transmitted.

Here, the random access procedure in the present embodiment will be described.

In uplink radio communication from the terminal apparatus 1 to the base station apparatus 3, for example, as described above, an uplink physical channel such as the Physical Random Access CHannel (PRACH) or the like is used. The uplink physical channels are used by a physical layer for transmission of information output from a higher layer.

The PRACH is used for transmission of the preamble used for the random access (information on the random access preamble). The PRACH is used for indicating the initial connection establishment procedure, the handover procedure, the connection re-establishment procedure, synchronization (timing adjustment) for uplink transmission, and the request for the PUSCH (UL-SCH) resource.

The CRC parity bits attached to the downlink control information transmitted on one PDCCH are scrambled with the C-RNTI, the SPS C-RNTI, or the Temporary C-RNTI. The C-RNTI and the SPS C-RNTI are identifiers for identifying the terminal apparatus 1 within a cell. The Temporary C-RNTI serves as an identifier for identifying the terminal apparatus 1 that has transmitted the random access preamble during performing a contention based random access procedure.

The C-RNTI and the Temporary C-RNTI are used to control PDSCH transmission or PUSCH transmission in a single subframe. The SPS C-RNTI is used to periodically allocate a resource for the PDSCH or the PUSCH.

In the present embodiment, a random access procedure may be performed in the primary cell and the secondary cell. However, only one random access procedure is performed at a point in the time domain. That is, multiple random access procedures are not performed simultaneously.

Note that, according to the present embodiment, one or both of the contention based random access procedure and a non-contention based random access procedure may be performed on the primary cell. In addition, according to the present embodiment, the non-contention based random access procedure may be performed on the secondary cell. Note that, according to the present embodiment, the contention based random access procedure is not performed on the secondary cell.

Note that, information indicating the random access preamble may be transmitted on the PRACH on the primary cell. In this case, the terminal apparatus 1 receives, from the base station apparatus 3, information (RRC message) indicating the preamble used for the random access procedure in the primary cell. The information indicating the preamble used for the random access procedure in the primary cell includes information indicating a set of PRACH resources in the primary cell.

Note that, the random access preamble may be transmitted on the PRACH in the secondary cell. In this case, the terminal apparatus 1 receives, from the base station apparatus 3, information (RRC message) indicating the preamble of the random access procedure in the secondary cell. The information indicating the preamble used for the random access procedure in the secondary cell includes information indicating the set of PRACH resources in the secondary cell.

In a case of the contention based random access procedure, the terminal apparatus 1 selects a random access preamble index. In a case of the non-contention based random access procedure, the terminal apparatus 1 selects the random access preamble index based on the information indicating the preamble used for the random access procedure. In a case that all the values of the bits corresponding to the information indicating the preamble used for the random access procedure received from the base station apparatus 3 are 0, the terminal apparatus 1 performs the contention based random access procedure, and selects the random access preamble index.

A random access response for the primary cell or the secondary cell is transmitted on the PDSCH on the primary cell. The random access response includes an uplink grant field to which the uplink grant is mapped and a Temporary C-RNTI field to which information for indicating the Temporary C-RNTI is mapped. The uplink grant included in the random access response is also referred to as a random access response grant.

In the received random access response, a random access preamble identifier corresponding to the transmitted random access preamble is included. In a case that the terminal apparatus 1 selects the random access preamble index based on the information indicating the preamble used for the random access procedure received by the terminal apparatus 1 from the base station apparatus 3, the terminal apparatus 1 determines that the non-contention based random access procedure succeeds (is completed), and performs transmission of the PUSCH based on the uplink grant included in the random access response.

In a case that the terminal apparatus 1 selects the random access preamble, the terminal apparatus 1 sets the Temporary C-RNTI as the value in the Temporary C-RNTI field included in the received random access response and transmits a random access message 3 on the PUSCH based on the uplink grant included in the random access response.

The PUSCH corresponding to the uplink grant included in the random access response is transmitted on the serving cell on which the corresponding random access preamble has been transmitted on the PRACH.

In a case that the Temporary C-RNTI is not set, the PUSCH corresponding to the uplink grant included in the random access response and the PUSCH retransmission of the same transport block are scrambled based on the C-RNTI.

In a case that the Temporary C-RNTI is set, the PUSCH corresponding to the uplink grant included in the random access response and the PUSCH retransmission of the same transport block are scrambled based on the Temporary C-RNTI.

In a case that the Temporary C-RNTI is set, the PUSCH retransmission of the transport block transmitted on the PUSCH corresponding to the uplink grant included in the random access response is scheduled with the DCI format 0 to which the CRC parity bits scrambled by the Temporary C-RNTI is added. The DCI format 0 is transmitted on the PDCCH in a Common Search Space.

In the downlink, one MAC PDU is allowed to include multiple random access responses. The MAC Random Access Response (RAR) indicates a random access response. The MAC PDU includes one MAC header, n random access responses, and padding. The one MAC header includes n E/T/RAPID subheaders (E/T/RAPID fields).

The E/T/RAPID subheader includes an Extension field (E field), a Type field (T field), and a Random Access Preamble Mentifier field (RAPID field). The E field is a flag indicating whether more fields are present in the MAC header. The E field is set to "1" to indicate that at least another set of the E/T/RAPID field follows. The E field is set to "0" to indicate that either the MAC RAR or the padding starts at the next byte.

The T field is a flag indicating whether the MAC subheader contains the RAPID field and a Backoff Indicator field. The T field is set to "1" to indicate the presence of the RAPID field in the MAC subheader.

The RAPID field identifies the transmitted random access preamble. In a case that the random access preamble transmitted by the terminal apparatus 1 corresponds to the RAPID field, the terminal apparatus 1 determines that the reception of the random access response has succeeded and processes the corresponding MAC RAR.

The MAC RAR includes an R field, a timing advance command field, an uplink grant field, and a Temporary C-RNTI field. The R field is a reserved bit set to 0. The timing advance command field indicates an index value $T_A$ used to control the amount of timing adjustment for PUSCH/SRS transmission.

The uplink grant field indicates PUSCH resources used in the uplink. The uplink grant field has an uplink grant mapped thereto. The Temporary C-RNTI field indicates the Temporary C-RNTI used by the terminal apparatus 1 in the contention based random access procedure.

As described above, according to the first embodiment, the terminal apparatus 1 performs the handover from the source cell to the target cell. The radio transmission and/or reception unit 10 (receiver) of the terminal apparatus 1 receives the handover command via the source cell. The higher layer processing unit 14 (controller) of the terminal apparatus 1 controls, in a case that the handover command includes the TA command, based on the TA command, transmission timing of the physical uplink shared channel in the target cell.

According to the configuration as described above, the terminal apparatus can efficiently continue the communication with the base station apparatus 3.

Second Embodiment

Next, a second embodiment will be described.

In the second embodiment, a case that there is no response to the PUSCH on which the RRC complete message is transmitted in step S410 (FIG. 6) in the first embodiment will be described.

A configuration of a radio communication system according to the second embodiment is the same as that of the radio communication system Sys1 according to the first embodiment, and thus descriptions thereof will be omitted.

Additionally, the configuration of the terminal apparatus 1 according to the second embodiment will be described focusing on the differences from the configuration of the terminal apparatus 1 according to the first embodiment, and descriptions of the same portions as in the first embodiment will be omitted.

Additionally, the configuration of the base station apparatus 3 according to the second embodiment will be described focusing on the differences from the configuration of the base station apparatus 3 according to the first embodiment, and descriptions of the same portions as in the first embodiment will be omitted.

Figure 7:
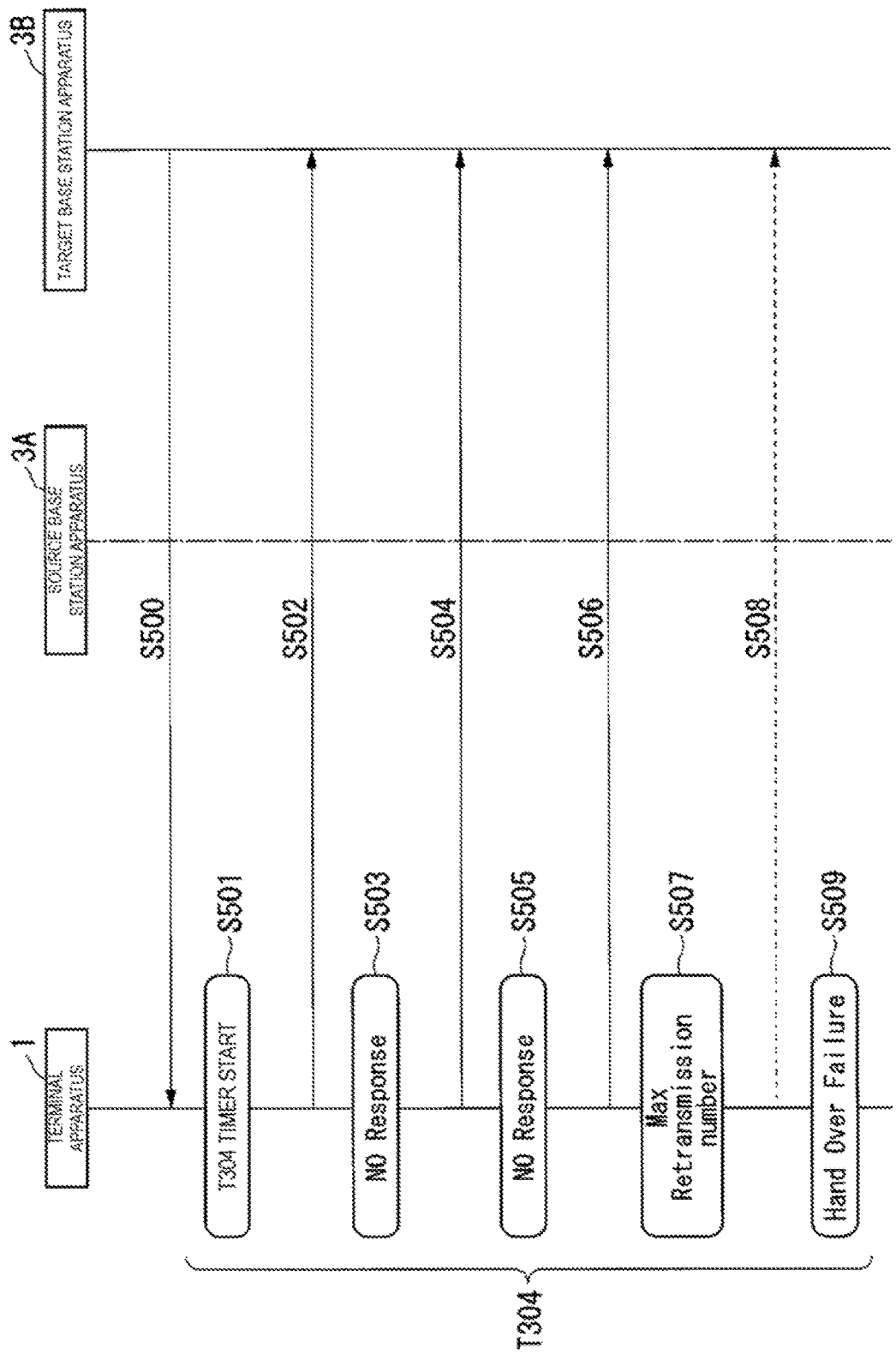
FIG. 7 is a sequence diagram illustrating an example in a case that there is no response to a PUSCH on which an RRC complete message is transmitted according to a second embodiment of the present invention.

FIG. 7 is a sequence diagram illustrating an example in a case that there is no response to the PUSCH on which the RRC complete message is transmitted according to the second embodiment of the present invention.

In step S500, the target base station apparatus 3B transmits the handover command to the terminal apparatus 1 via the source base station apparatus 3A. The handover command includes the TA Command and the UL grant.

In step S501, the terminal apparatus 1 starts a T304 timer, in a case of receiving the handover command from the target base station apparatus 3B in step S500, that is a handover timer. Here, in a case that a predetermined period of the T304 timer expires, the terminal apparatus 1 determines that the Handover (HO) has failed (HO failure).

In step S502, the terminal apparatus 1 transmits, in the target cell, to the target base station apparatus 3B, based on the TA Command and the uplink grant included in the notified handover command, the RRC complete message including the C-RNTI using the PUSCH indicated by the uplink grant, by the TA included in the TA Command.

In step S503, the terminal apparatus 1 assumes that there is no response to the RRC complete message that is transmitted to the target base station apparatus 3B in step S502 for a prescribed period (illustrated as "NO Response").

In step S504, the terminal apparatus 1 retransmits the RRC complete message, based on the No Response in step S503, to the target base station apparatus 3B via the source base station apparatus 3A using the PUSCH.

In step S505, the terminal apparatus 1 assumes that there is no response to the RRC complete message that is transmitted to the target base station apparatus 3B in step S504 for a prescribed period (illustrated as "NO Response"). Note that the prescribed period, as a higher layer parameter, may be provided from the source base station apparatus 3A or the target base station apparatus 3B, may be defined beforehand in the terminal apparatus 1, or may be broadcast as broadcast information or system information.

In step S506, the terminal apparatus 1 retransmits the RRC complete message, based on the No Response in step S505, to the target base station apparatus 3B via the source base station apparatus 3A using the PUSCH.

In step S507, the terminal apparatus 1 determines whether the number of times of the retransmission reaches the maximum number of times of retransmission. Information on the maximum number of times of retransmission is configured for the terminal apparatus 1 by the target base station apparatus 3B. This information on the maximum number of times of retransmission is included in the parameter mobilityControlInfo in the handover command. The terminal apparatus 1 does not retransmit the RRC complete message in a case that the number of times of the retransmission is determined to have reached the maximum number of times of retransmission.

Note that, the target base station apparatus 3B may configure a retransmission timer for the terminal apparatus 1 instead of configuring the number of times of the retransmission. In this case, it is sufficient for timer information on the retransmission timer to be included in the parameter mobilityControlInfo in the handover command, and it is sufficient for the handover command to be transmitted to the terminal apparatus 1.

Note that, in a case that the period configured for the prescribed retransmission timer expires, the terminal apparatus 1 may not retransmit the RRC complete message.

Note that, the information on the maximum number of times of retransmission may be information that is used for control of the number of times of retransmission in a case that there is no response to the transmitted RRC complete message.

In step S508, in a case that the number of times of the retransmission is determined to have reached the maximum number of times of retransmission or in a case that the retransmission timer expires, the terminal apparatus 1 may perform the random access procedure, Additionally, in step S508, in a case that the number of times of the retransmission is determined to have reached the maximum number of times of retransmission or in a case that the retransmission timer expires, and in a case that the information indicating the preamble used for the random access procedure (RACH-ConfigDedicated) is configured (included) in the parameter mobilityControlInfo, the terminal apparatus 1 may perform the non-contention based random access procedure based on the information indicating the preamble used for the random access procedure. In step S508, in a case that the number of times of the retransmission is determined to have reached the maximum number of times of retransmission or in a case that the retransmission timer expires, and in a case that the information indicating the preamble used for the random access procedure (RACH-ConfigDedicated) is not configured (not included) in the parameter mobilityControlInfo, the terminal apparatus 1 may perform the contention based the random access procedure.

Note that, in a case that the information indicating the preamble used for the random access procedure is not configured (not included) in the parameter mobilityControlInfo, the terminal apparatus 1 may determine that the handover has failed (Handover Failure). Note that, the number of times of retransmission may include the initial transmission of the RRC complete message, or may include only the number of times of retransmission. Additionally, in a case of management using the timer, the terminal apparatus 1 may activate the retransmission timer at a timing of (simultaneously with) the initial transmission of the RRC complete message being performed, or may activate the retransmission timer at a timing of the retransmission of the RRC complete message (second transmission) being performed.

In step S509, in a case that the predetermined period of the T304 timer expires, the terminal apparatus 1 determines that the handover has failed (Handover Failure). Here, a valid period of the T304 timer that is started in step S501 is the predetermined period, in a case that the period expires, it is determined that the handover has failed. (Handover Failure). In the example illustrated in the diagram, a period from step S501 to step S509 is the predetermined period T304 in which the T304 timer is valid.

The terminal apparatus 1 may determine (check) an operation of the handover procedure, in a case that a response from the target base station apparatus 3B to the PUSCH on which the RRC complete message is transmitted is detected in any period of step S503, step S505, and step S507, based on the detected response.

Note that, the terminal apparatus 1 may restart or reset the number of times of the retransmission or the retransmission timer, in a case that a response from the target base station apparatus 3B to the PUSCH on which the RRC complete message is transmitted is detected, based on the response to the PUSCH. For example, in a case that the response to the PUSCH from to the target base station apparatus 3B is the ACK, the terminal apparatus 1 may reset the number of times of the retransmission or the retransmission timer. Additionally, in a case that the response to the PUSCH from the target base station apparatus 3B is the NACK, the terminal apparatus 1 may restart the number of times of the retransmission or the retransmission timer.

Note that, the terminal apparatus 1 may detect the response from the target base station apparatus 3B to the PUSCH on which the RRC complete message is transmitted, based on reception of the PHICH or the PUCCH/EPDCCH. For example, the terminal apparatus 1 may detect the response to the PUSCH transmission in step S410. In this case, the terminal apparatus 1 may complete the handover procedure based on the detection of the response, or may determine that the handover has succeeded based on the detection of the response. Additionally, in a case that the response from the target base station apparatus 3B is detected in the PDCCH/EPDCCH, the terminal apparatus 1 may determine (check) the operation of the RRC complete message retransmission based on the response from the target base station apparatus 3B detected in the PDCCH/EPDCCH, regardless of whether or not the response is detected in the PHICH. Additionally, in a case that the PDCCH/EPDCCH including the DCI format not indicating the retransmission in a New Data Indicator (NDI) field is detected, the terminal apparatus 1 may determine that the handover has succeeded and may complete processing of the handover procedure. Additionally, in a case that the PDCCH/EPDCCH including the DCI format not indicating the retransmission in the New Data Indicator (NDI) field is detected, the terminal apparatus 1 may not retransmit the RRC complete message. Additionally, in a case that the PDCCH/EPDCCH including the DCI format indicating the retransmission is detected, the terminal apparatus 1 may retransmit the RRC complete message on the PUSCH based on the DCI format.

Note that, in a case that the response from the target base station apparatus 3B is detected only in the PHICH and the response indicates the ACK, the terminal apparatus 1 may regard the handover as successful. Additionally, in a case that the response from the target base station apparatus 3B is detected only in the PHICH and the response indicates the MACK, the terminal apparatus 1 may retransmit the RRC complete message on the PUSCH based on the TA Command and the uplink grant (UL grant).

As described above, according to the second embodiment, the terminal apparatus 1 performs the handover from the source cell to the target cell. The radio transmission and/or reception unit 10 (receiver) of the terminal apparatus 1 receives the handover command via the source cell. In a case that the handover command includes the information on the maximum number of times of retransmission, based on the information on the maximum number of times of retransmission, the higher layer processing unit 14 (controller) of the terminal apparatus 1 controls the number of times of retransmission of the complete message to target cell on the physical uplink shared channel.

According to the configuration as described above, the terminal apparatus 1 can efficiently continue the communication with the base station apparatus 3, Third Embodiment Next, a third embodiment will be described.

In the third embodiment, described is an example in a case that the response to the PUSCH on which the RRC complete message is transmitted in step S410 (FIG. 6) in the first embodiment is a NACK or in a case that the response to the PUSCH on which the RRC complete message is transmitted in step S410 (FIG. 6) in the first embodiment is performed on the PDCCH/EPDCCH including the DCI format that indicates retransmission.

A configuration of a radio communication system according to the third embodiment is the same as that of the radio communication system Sys1 according to the first embodiment, and thus descriptions thereof will be omitted.

Additionally, the configuration of the terminal apparatus 1 according to the third embodiment will be described focusing on the differences from the configuration of the terminal apparatus 1 according to the first embodiment, and descriptions of the same portions as in the first embodiment will be omitted.

Additionally, the configuration of the base station apparatus 3 according to the third embodiment will be described focusing on the differences from the configuration of the base station apparatus 3 according to the first embodiment, and descriptions of the same portions as in the first embodiment will be omitted.

Figure 8:
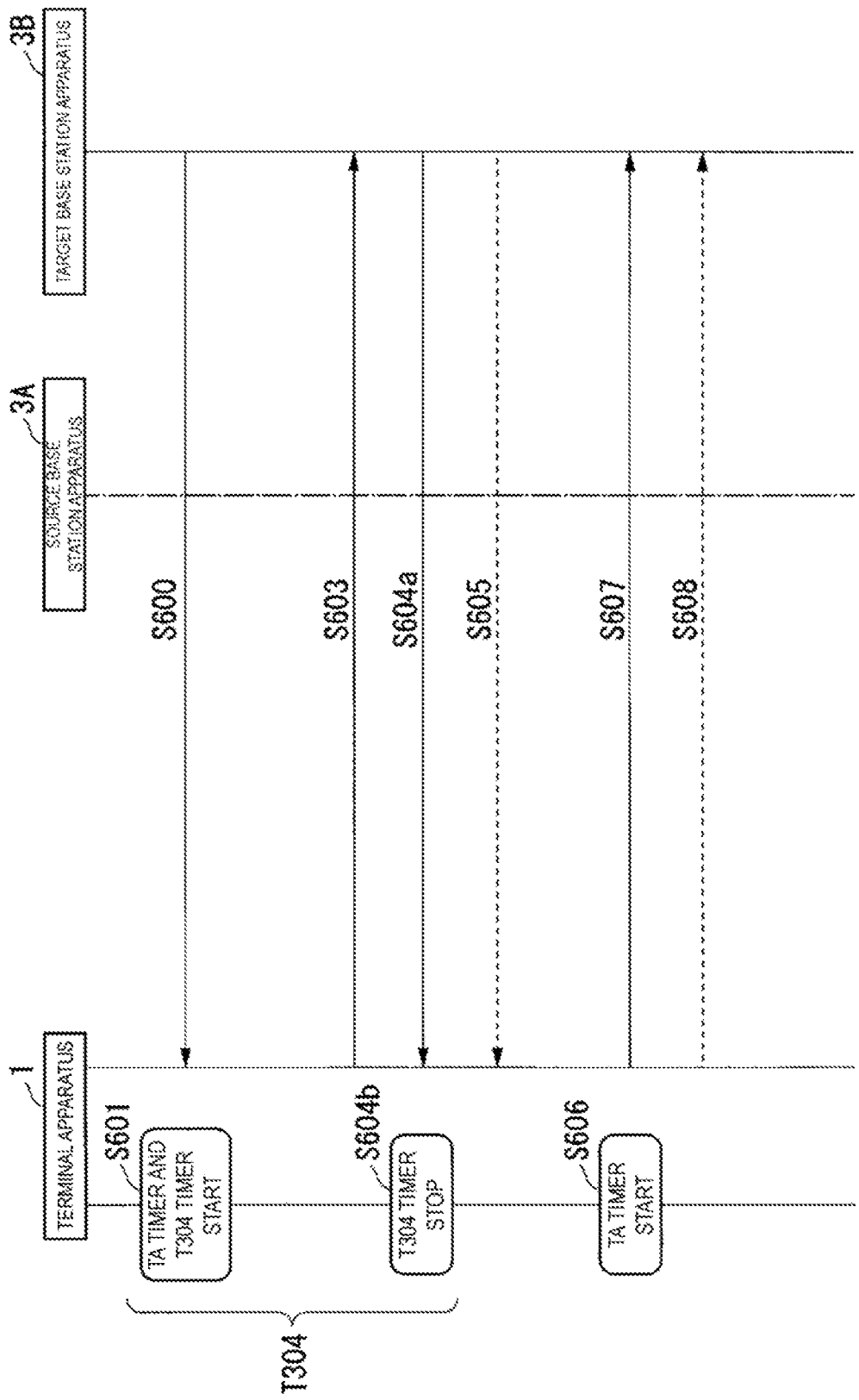
FIG. 8 is a sequence diagram illustrating an example in a case that the response to the PUSCH on which the RRC complete message is transmitted is a NACK or in a case that the response to the PUSCH on which the RRC complete message is transmitted is performed on PDCCH/EPDCCH including a DCI format that indicates retransmission according to a third embodiment of the present invention.

FIG. 8 is a sequence diagram illustrating the example in the case that the response to the PUSCH on which the RRC complete message is transmitted is a NACK or in the case that the response to the PUSCH on which the RRC complete message is transmitted is performed on the PDCCH/EPDCCH including the DCI format that indicates retransmission according to the third embodiment of the present invention.

In step S600, the target base station apparatus 3B transmits a handover command to the terminal apparatus 1 via the source base station apparatus 3A. This handover command may include the TA Command and the UL grant.

In step S601, the terminal apparatus 1 starts a TA timer, in a case of receiving the handover command from the target base station apparatus 3B in step S600, based on the TA Command in the handover command, that is one of the timers used for the handover.

In step S601, the terminal apparatus 1 starts a T304 timer, in a case of receiving the handover command from the target base station apparatus 3B in step S600, that is a handover timer.

In step S603, the terminal apparatus 1 transmits, in the target cell, to the target base station apparatus 3B, based on the TA Command and the uplink grant (ULgrant) included in the notified handover command, the RRC complete message including the C-RNTI using the PUSCH indicated by the uplink grant, by the TA included in the TA Command.

In step S604a, the target base station apparatus 3B transmits a response to the RRC complete message in step S603 to the terminal apparatus 1. At this time, the target base station apparatus 3B transmits the ACK response in a case of correctly receiving the RRC complete message, and transmits the NACK response in a case of not correctly receiving the RRC complete message or requesting retransmission, on the PHICH to the terminal apparatus 1.

The target base station apparatus 3B may transmit the NACK response on the PDCCH/EPDCCH to the terminal apparatus 1 in a case of indicating the retransmission of the RRC complete message.

Note that, the target base station apparatus 3B may transmit the PDCCH/EPDCCH including the DCI format indicating the retransmission in the NDI field to the terminal apparatus 1 in a case of indicating the retransmission of the RRC complete message.

Note that, the terminal apparatus 1 may complete processing of the handover procedure in a case of detecting the response to the PUSCH transmission in step S603. In other words, the terminal apparatus 1 may regard the handover as successful based on the detection of the response to the PUSCH transmission.

In step S604b, in a case that the terminal apparatus 1 detects, in step S604a, the response to the PUSCH transmission in step S603, the terminal apparatus 1 may stop the T304 timer.

Note that, in step S605, the target base station apparatus 3B may measure the TA using the DMRS time-multiplexed with the PUSCH. At this time, in a case that it is necessary to adjust the TA, the target base station apparatus 3B may transmit a new TA Command on the PDSCH to the terminal apparatus 1. Additionally, in a case that it is necessary to notify the terminal apparatus 1 of the uplink grant again, the target base station apparatus 3B may transmit information on the UL grant by including it in the PDSCH.

In step S606, the terminal apparatus 1 may reset and start (restart) the TA timer in a case of receiving the PDSCH including the TA Command in step S605. Note that, the operation "reset and start (restart)" described above may be an operation in which the TA timer is reset to a prescribed value or a predetermined value and started, or may be an operation in which the TA timer is reset to 0 and started.

In step S607, the terminal apparatus 1 retransmits, to the target base station apparatus 3B, based on the TA Command received on the PUSCH in step S605 and the uplink grant, the RRC complete message including the C-RNTI using the PUSCH indicated by the uplink grant, by the TA included in the TA Command.

In step S608, in a case that the prescribed TA timer in step S601 or step S606 expires, and in a case that the information indicating the preamble used for the random access procedure is included in the parameter mobilityControlInfo, the terminal apparatus 1 performs the random access procedure based on the information indicating the preamble used for the random access procedure. Note that, in a case that the information indicating the preamble used for the random access procedure is not configured in the parameter mobilityControlInfo, the terminal apparatus 1 may determine that the handover has failed (Handover Failure).

Note that, in step S608, in a case that the prescribed TA timer in step S601 or step S606 expires, the terminal apparatus 1 may regard the uplink synchronization as being broken (out of synchronization) and may perform the random access procedure.

Note that, in step S604b, in a case that the predetermined T304 period expires, the terminal apparatus 1 determines that the handover has failed (Handover Failure).

In the example illustrated in the diagram, a period from step S601 to step S604b is the predetermined period T304 in which the T304 timer is valid.

Note that, each of the handover procedures illustrated in FIG. 6, FIG. 7, and FIG. 8 described above may be independently performed, or each of the handover procedures illustrated in FIG. 6, FIG. 7, FIG. 8 described above may be performed, for example, in a case that there is no response to the RRC complete message or in a case that the retransmission is indicated from the target base station apparatus 3B to the terminal apparatus 1, using any one or both the handover procedure illustrated in FIG. 7 and FIG. 8.

Note that, the terminal apparatus 1 that determines the handover having been failed may initialize a cell selection procedure, and may transmit an RRCConnectionReestablishment request message to the source base station apparatus 3A or the target base station apparatus 3B. The source base station apparatus 3A or the target base station apparatus 39 may transmit, to the terminal apparatus 1, information necessary for a connection reestablishment (for example, measurement control message).

A program running on each of the base station apparatus 3 and the terminal apparatus 1 according to an aspect of the present invention may serve as a program that controls a Central Processing Unit (CPU) and the like (a program for causing a computer to operate) in such a manner as to enable the functionalities described in the above-described embodiments and variations according to an aspect of the present invention. The information handled in each of these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal apparatus 1 and the base station apparatus 3 according to each of the above-described embodiments and variations may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal apparatus 1 or the base station apparatus 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station apparatus 3 according to each of the above-described embodiments and variations is achieved as an aggregation (a device group) constituted of multiple devices. Each of the devices constituting such a device group may include some or all portions of each function or each functional block of the base station apparatus 3 according to each of the above-described embodiments and variations. The device group may include each general function or each functional block of the base station apparatus 3. Furthermore, the terminal apparatus 1 according to the above-described embodiment can also communicate with the base station apparatus 3 as the aggregation.

Furthermore, the base station apparatus 3 according to each of the above-described embodiments and variations may serve as an Evolved Universal Terrestrial Radio Access Network (EUTRAN). Furthermore, the base station apparatus 3 according to each of the above-described embodiments and variations may have some or all portions of the functions of a node higher than an eNodeB.

Furthermore, some or all portions of each of the terminal apparatus 1 and the base station apparatus 3 according to each of the above-described embodiments and variations may be achieved as an LSI which is a typical integrated circuit or may be achieved as a chip set. The functional blocks of each of the terminal apparatus 1 and the base station apparatus 3 according to each of the above-described embodiments and variations may be individually achieved as a chip, or some or all of the functional blocks may be integrated into a chip. The circuit integration technique is not limited to LSI, and the integrated circuits for the functional blocks may be realized as dedicated circuits or a general-purpose processor. Furthermore, in a case where with advances in semiconductor technology, a circuit integration technology with which an LSI is replaced appears, it is also possible to use an integrated circuit based on the technology.

Furthermore, according to each of the above-described embodiments and variations, the terminal apparatus is described as one example of a communication device, but an aspect of the present invention is not limited to this, and can be applied to a fixed-type or a stationary-type electronic apparatus installed indoors or outdoors, for example, a terminal apparatus or a communication device, such as an audio-video (AV) apparatus, a kitchen apparatus, a cleaning or washing machine, an air-conditioning apparatus, office equipment, a vending machine, an automobile, a bicycle, and other household apparatuses.

Each of the embodiments and variations according to an aspect of the present invention have been described in detail above referring to the drawings, but the specific configuration is not limited to each of the embodiments and variations and includes, for example, an amendment to a design that falls within the scope that does not depart from the gist of the present invention. Furthermore, various modifications are possible within the scope of an aspect of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described in the embodiments and variations is also included in the technical scope of the present invention.

For example, one aspect of the present invention may be achieved by combining some or all of each of the embodiments and variations.

(Supplementary Note 1) A terminal apparatus 1 configured to perform a handover from a source cell to a target cell, the terminal apparatus including: a receiver (radio transmission and/or reception unit 10) configured to receive a handover command via the source cell; and a controller (higher layer processing unit 14), in a case that a TA command is included in the handover command, based on the TA command, configured to control a transmission timing of a physical uplink shared channel in the target cell.

(Supplementary Note 2) The terminal apparatus according to (Supplementary Note 1), the terminal apparatus including a transmitter (radio transmission and/or reception unit 10) configured to transmit a complete message using the physical uplink shared channel.

(Supplementary Note 3) The terminal apparatus according to (Supplementary Note 1), wherein, in a case that the TA command is not included in the handover command, the controller (higher layer processing unit 14) performs a random access procedure in the target cell.

(Supplementary Note 4) The terminal apparatus according to (Supplementary Note 3), wherein, in a case that a prescribed condition is satisfied, the controller (higher layer processing unit 14) identifies whether the TA command is included in the handover command.

(Supplementary Note 5) The terminal apparatus according to (Supplementary Note 4), wherein the prescribed condition is that a function of the handover in which the random access procedure is not used is supported.

(Supplementary Note 6) The terminal apparatus according to (Supplementary Note 4), wherein the prescribed condition is to transmit information indicating that the function of the handover in which the random access procedure is not used is supported.

(Supplementary Note 7) A terminal apparatus 1 configured to perform a handover from a source cell to a target cell, the terminal apparatus including: a receiver (radio transmission and/or reception unit 10) configured to receive a handover command via the source cell; and a controller (higher layer processing unit 14), in a case that information on the maximum number of times of retransmission is included in the handover command, based on the information on the maximum number of times of retransmission, configured to control the number of times of retransmission of a complete message on a physical uplink shared channel to the target cell.

(Supplementary Note 8) The terminal apparatus according to (Supplementary Note 7), wherein, in a case that the information on the maximum number of times of retransmission is not included in the handover command, the controller (higher layer processing unit 14) performs a random access procedure in the target cell.

(Supplementary Note 9) The terminal apparatus according to (Supplementary Note 7), the terminal apparatus including a transmitter (radio transmission and/or reception unit 10), in a case that a TA command is included in the handover command, based on the TA command, configured to transmit the complete message.

(Supplementary Note 10) The terminal apparatus according to (Supplementary Note 7), the terminal apparatus including: a calculator (higher layer processing unit 14) configured to calculate a TA value; and a transmitter (radio transmission and/or reception unit 10), in a case that a TA command is not included in the handover command, based on the handover command and the TA value, configured to transmit the complete message.

(Supplementary Note 11) The terminal apparatus according to (Supplementary Note 7), wherein the controller (higher layer processing unit 14) controls such as not to retransmit the complete message in a case of reaching the maximum number of times of transmission based on the information on the maximum number of times of retransmission.

(Supplementary Note 12) The terminal apparatus according to (Supplementary Note 7), wherein, in a case of reaching the maximum number of times of transmission based on the information on the maximum number of times of retransmission, and in a case that information indicating the preamble used for the random access procedure is included in the handover command, the controller (higher layer processing unit 14) starts a non-contention based random access procedure.

(Supplementary Note 13) The terminal apparatus according to (Supplementary Note 7), wherein, in a case of reaching the maximum number of times of transmission based on the information on the maximum number of times of retransmission, and in a case that the information indicating the preamble used for the random access procedure is not included in the handover command, the controller (higher layer processing unit 14) starts a contention based random access procedure.

(Supplementary Note 14) A base station apparatus (target base station apparatus 3B) of a target cell, for communicating with a terminal apparatus 1 configured to perform a handover from a source cell to the target cell, the base station apparatus including: a transmitter (radio transmission and/or reception unit 30) configured to transmit a handover command to the terminal apparatus 1; and a controller (higher layer processing unit 34), in a case that a TA command is included in the handover command, based on the TA command, configured to cause the terminal apparatus 1 to control a transmission timing of a physical uplink shared channel in the target cell.

(Supplementary Note 15) The base station apparatus according to (Supplementary Note 14), the base station apparatus including a receiver (radio transmission and/or reception unit 30) configured to receive a complete message using the physical uplink shared channel from the terminal apparatus.

(Supplementary Note 16) The base station apparatus according to (Supplementary Note 14), wherein, in a case that the controller (higher layer processing unit 34) does not include the TA command in the handover command, a random access procedure is performed in the target cell.

(Supplementary Note 17) The base station apparatus according to (Supplementary Note 16), wherein, in a case that a prescribed condition is satisfied, the controller (higher layer processing unit 34) determines whether to include the TA command in the handover command.

(Supplementary Note 18) The base station apparatus according to (Supplementary Note 17), wherein the prescribed condition is that the terminal apparatus supports a function of the handover in which the random access procedure is not used.

(Supplementary Note 19) The base station apparatus according to (Supplementary Note 17), wherein the prescribed condition is to receive information indicating that the function of the handover in which the random access procedure is not used is supported from the terminal apparatus 1.

(Supplementary Note 20) A base station apparatus (target base station apparatus 3B) of a target cell, for communicating with a terminal apparatus 1 configured to perform a handover from a source cell to the target cell, the base station apparatus including: a transmitter (radio transmission and/or reception unit 30) configured to transmit a handover command to the terminal apparatus; and a controller (higher layer processing unit 34), in a case that information on the maximum number of times of retransmission is included in the handover command, based on the information on the maximum number of times of retransmission, configured to cause the terminal apparatus to control the number of times of retransmission of a complete message on a physical uplink shared channel to the target cell.

(Supplementary Note 21) The base station apparatus according to (Supplementary Note 20), wherein, in a case that the controller (higher layer processing unit 34) does not include the information on the maximum number of times of retransmission in the handover command, a random access procedure is performed in the target cell.

(Supplementary Note 22) The base station apparatus according to (Supplementary Note 20), the base station apparatus including a receiver (radio transmission and/or reception unit 30), in a case that a TA command is included in the handover command, based on the TA command, configured to receive the complete message.

(Supplementary Note 23) The base station apparatus according to (Supplementary Note 20), the base station apparatus including a receiver (radio transmission and/or reception unit 30), in a case that a TA command is not included in the handover command, based on the handover command and a TA value, configured to receive the complete message.

(Supplementary Note 24) The base station apparatus according to (Supplementary Note 20), wherein, in a case of reaching the maximum number of times of transmission based on the information on the maximum number of times of retransmission, the complete message is not received.

(Supplementary Note 25) The base station apparatus according to (Supplementary Note 20), wherein, in a case of reaching the maximum number of times of transmission based on the information on the maximum number of times of retransmission, and in a case that information indicating the preamble used for the random access procedure is included in the handover command, a non-contention based random access procedure is started.

(Supplementary Note 26) The base station apparatus according to (Supplementary Note 20), wherein, in a case of reaching the maximum number of times of transmission based on the information on the maximum number of times of retransmission, and in a case that information indicating the preamble used for the random access procedure is not included in the handover command, a contention based random access procedure is started.

(Supplementary Note 27) A control method used in a terminal apparatus 1 configured to perform a handover from a source cell to a target cell, the control method including the steps of: receiving a handover command via the source cell; and controlling, in a case that a TA command is included in the handover command, based on the TA command, a transmission timing of a physical uplink shared channel in the target cell.

(Supplementary Note 28) A control method of a terminal apparatus 1 configured to perform a handover from a source cell to a target cell, the communication method including the steps of: receiving a handover command via the source cell; and controlling, in a case that information on the maximum number of times of retransmission is included in the handover command, based on the information on the maximum number of times of retransmission, the number of times of retransmission of a complete message on a physical uplink shared channel to the target cell.

(Supplementary Note 29) A control method used in a base station apparatus of a target cell, for communicating with a terminal apparatus 1 configured to perform a handover from a source cell to the target cell, the control method including the steps of: transmitting a handover command to the terminal apparatus; and causing the terminal apparatus, in a case that a TA command is included in the handover command, based on the TA command, to control a transmission timing of a physical uplink shared channel in the target cell.

(Supplementary Note 30) A control method used in a base station apparatus (target base station apparatus 3B) of a target cell, for communicating with a terminal apparatus configured to perform a handover from a source cell to the target cell, the control method including the steps of: transmitting a handover command to the terminal apparatus; and causing the terminal apparatus, in a case that information on the maximum number of times of retransmission is included in the handover command, based on the information on the maximum number of times of retransmission, to control the number of times of retransmission of a complete message on a physical uplink shared channel to the target (Supplementary Note 31) An integrated circuit mounted on a terminal apparatus 1 configured to perform a handover from a source cell to a target cell, the integrated circuit configured to cause exhibition of: a function to receive a handover command via the source cell; and a function to control, in a case that a TA command is included in the handover command, based on the TA command, a transmission timing of a physical uplink shared channel in the target cell.

(Supplementary Note 32) An integrated circuit mounted on a terminal apparatus 1 configured to perform a handover from a source cell to a target cell, the integrated circuit configured to cause exhibition of: a function to receive a handover command via the source cell; and a function, in a case that information on the maximum number of times of retransmission is included in the handover command, based on the information on the maximum number of times of retransmission, to control the number of times of retransmission of a complete message on a physical uplink shared channel to the target cell.

(Supplementary Note 33) An integrated circuit mounted on a base station apparatus (target base station apparatus 3B), for communicating with a terminal apparatus configured to perform a handover from a source cell to a target cell, of the target cell, the integrated circuit configured to cause exhibition of: a function to transmit a handover command to the terminal apparatus; and a function to cause the terminal apparatus, in a case that a TA command is included in the handover command, based on the TA command, to control a transmission timing of a physical uplink shared channel in the target cell.

(Supplementary Note 34) An integrated circuit mounted on a base station apparatus (target base station apparatus 3B) of a target cell, for communicating with a terminal apparatus configured to perform a handover from a source cell to the target cell, the integrated circuit configured to cause exhibition of: a function to transmit a handover command to the terminal apparatus; and a function to cause the terminal apparatus, in a case that information on the maximum number of times of retransmission is included in the handover command, based on the information on the maximum number of times of retransmission, to control the number of times of retransmission of a complete message on a physical uplink shared channel to the target cell.

REFERENCE SIGN LIST

Sys1 Radio communication system
1 Terminal apparatus
3 Base station apparatus
3A Source base station apparatus
3B Target base station apparatus
4 MME/GW
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RE unit
33 Baseband unit
34 Higher layer processing unit
35 Medium access control layer processing unit
36 Radio resource control layer processing unit

The invention claimed is:

1. A terminal apparatus comprising:
a receiver configured to receive a handover command from a source base station apparatus; and
a transmitter configured to transmit a radio resource control (RRC) complete message to a target base station apparatus after performing downlink synchronization of a target primary cell based on the handover command, wherein
the receiver is further configured to receive a downlink control information (DCI) transmitted on a physical downlink control channel (PDCCH) with a cyclic redundancy check (CRC) parity bit scrambled by a cell-radio network temporary identifier (C-RNTI) from the target base station apparatus, the DCI including a downlink assignment, and
in a case that the handover command includes a parameter indicating a timing advance (TA) and the receiver receives a response to the RRC complete message based on the downlink assignment from the target base station apparatus, a T304 timer is stopped.

2. The terminal apparatus according to claim 1, wherein the terminal apparatus is configured to perform a random access procedure in the target primary cell, in a case that the handover command does not include a parameter associated with the TA.

3. The terminal apparatus according to claim 1, wherein the RRC complete message is transmitted using physical uplink shared channel (PUSCH), and the PUSCH is scheduled based on an uplink grant included in the handover command.

4. A base station apparatus comprising:
a transmitter configured to send a handover command to a terminal apparatus through a source base station; and
a receiver configured to receive a radio resource control (RRC) complete message from the terminal apparatus, wherein the transmitter is configured to transmit a downlink control information (DCI) transmitted on a physical downlink control channel (PDCCH) with a cyclic redundancy check (CRC) parity bit scrambled by a cell-radio network temporary identifier (C-RNTI) to the terminal apparatus, the DCI including a downlink assignment, and
in a case that the handover command includes a parameter indicating a timing advance (TA) and a response to the RRC complete message based on the downlink assignment is transmitted to the terminal apparatus, a T304 timer is stopped by the terminal apparatus.

5. The base station apparatus according to claim 4, wherein in a case that the handover command does not include a parameter associated with the TA, a random access procedure is performed in the target primary cell by the terminal apparatus.

6. The base station apparatus according to claim 4, wherein the RRC complete message is transmitted using physical uplink shared channel (PUSCH), and the PUSCH is scheduled based on an uplink grant included in the handover command.

7. A communication method used in a terminal apparatus, the communication method comprising:
receiving a handover command from a source base station apparatus;
transmitting a radio resource control (RRC) complete message to a target base station apparatus after performing downlink synchronization of a target primary cell based on the handover command;
receiving a downlink control information (DCI) transmitted on a physical downlink control channel (PDCCH) with a cyclic redundancy check (CRC) parity bit scrambled by a cell-radio network temporary identifier (C-RNTI) from the target base station apparatus, the DCI including a downlink assignment; and
stopping a T304 timer in a case that the handover command includes a parameter indicating a timing advance (TA) and a response to the RRC complete message is received based on the downlink assignment from the target base station apparatus.

8. The communication method according to claim 7, wherein, in a case that the handover command does not include a parameter associated with the TA, a random access procedure is performed in the target primary cell.

9. The communication method according to claim 7, wherein the RRC complete message is transmitted using physical uplink shared channel (PUSCH), and the PUSCH is scheduled based on an uplink grant including the handover command.

10. A communication method comprising:
transmitting a handover command from a source base station apparatus to a terminal apparatus;
transmitting a radio resource control (RRC) complete message from the terminal apparatus to a target base station apparatus after downlink synchronization with a downlink of a target primary cell being performed based on the handover command;
receiving by the terminal apparatus a downlink control information (DCI) transmitted on a physical downlink control channel (PDCCH) with a cyclic redundancy check (CRC) parity bit scrambled by a cell-radio network temporary identifier (C-RNTI) from the target base station apparatus, the DCI including a downlink assignment; and stopping a T304 timer by the terminal apparatus in a case that the handover command includes a parameter indicating a timing advance (TA) and a response to the RRC complete message is transmitted to the terminal apparatus based on the downlink assignment from the target base station apparatus.

11. The communication method according to claim 10, wherein, in a case that the handover command does not include a parameter associated with the TA, a random access procedure is performed in the target primary cell by the terminal apparatus.

12. The communication method according to claim 10, wherein the RRC complete message is transmitted using physical uplink shared channel (PUSCH), and the PUSCH is scheduled based on an uplink grant included in the handover command.

13. An integrated circuit mounted on a terminal apparatus, the integrated circuit causing the terminal apparatus to perform at least:

receiving a handover command from a source base station apparatus; and transmitting a Radio Resource control (RRC) complete message to a target base station apparatus after performing downlink synchronization with a downlink of a target primary cell based on the handover command; and receiving a downlink control information (DCI) transmitted on a physical downlink control channel (PDCCH) with a cyclic redundancy check (CRC) parity bit scrambled by a cell-radio network temporary identifier (C-RNTI) from the target base station apparatus, the DCI including a downlink assignment, wherein, in a case that the handover command includes a parameter indicating a timing advance (TA) and a response to the RRC complete message is received based on the downlink assignment from the target base station apparatus, stopping a T304 timer is caused to be exhibited.

14. The integrated circuit according to claim 13, wherein the integrated circuit causes the terminal apparatus to further perform, in a case that the handover command does not include a parameter associated with the TA, performing a random access procedure in the target primary cell.

15. The integrated circuit according to claim 13, wherein the RRC complete message is transmitted using physical uplink shared channel (PUSCH), and the PUSCH is scheduled based on an uplink grant included in the handover command.

16. An integrated circuit mounted on a base station apparatus, the integrated circuit causing the base station apparatus to perform at least:

sending a handover command to the terminal apparatus through a source base station;

receiving a Radio Resource control (RRC) complete message from the terminal apparatus; and transmitting a downlink control information (DCI) transmitted on a physical downlink control channel (PDCCH) with a cyclic redundancy check (CRC) parity bit scrambled by a cell-radio network temporary identifier (C-RNTI) to the terminal apparatus, the DCI including a downlink assignment, wherein in a case that the handover command includes a parameter indicating a Timing Advance (TA) and a response to the RRC complete message based on the downlink assignment is transmitted to the terminal apparatus, stopping a T304 timer by the terminal apparatus.

17. The integrated circuit according to claim 16, wherein in a case that the handover command does not include a parameter associated with the TA, a random access procedure is performed in the target primary cell by the terminal apparatus.

18. The integrated circuit according to claim 16, wherein the RRC complete message is transmitted using physical uplink shared channel (PUSCH), and the PUSCH is scheduled based on an uplink grant included in the handover command.

* * * * *